US008858103B2

(12) United States Patent
Hargreaves et al.

(10) Patent No.: US 8,858,103 B2
(45) Date of Patent: *Oct. 14, 2014

(54) COMPUTER KEYBOARD WITH FIRST AND SECOND MODULES HAVING ADJUSTABLE ANGLE

(71) Applicant: Kinesis Corporation, Bothell, WA (US)

(72) Inventors: William R. Hargreaves, Bellevue, WA (US); Carsten Buus, Snohomiosh, WA (US); Jonathan H. Biggs, Lake Forest Park, WA (US); Mark Ando, Seattle, WA (US)

(73) Assignee: Kinesis Corporation, Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,008

(22) Filed: Oct. 8, 2012

(65) Prior Publication Data
US 2013/0183074 A1    Jul. 18, 2013

Related U.S. Application Data

(63) Continuation of application No. 11/788,773, filed on Apr. 19, 2007, now Pat. No. 8,289,684.

(60) Provisional application No. 60/793,528, filed on Apr. 19, 2006, provisional application No. 60/872,522, filed on Dec. 4, 2006.

(51) Int. Cl.
*G06F 3/02* (2006.01)

(52) U.S. Cl.
CPC ............ *G06F 3/0219* (2013.01); *G06F 3/0216* (2013.01); *G06F 3/0208* (2013.01)
USPC ....................... 400/489; 400/472; 361/679.12

(58) Field of Classification Search
USPC ................. 400/472, 489; 361/679.17, 679.12
See application file for complete search history.

(56) References Cited

U.S. PATENT DOCUMENTS

| 1,395,049 A | 10/1921 | McNamara |
| 1,652,464 A | 12/1927 | Tyberg |

(Continued)

FOREIGN PATENT DOCUMENTS

| JP | 7160386 A | 6/1995 |
| JP | 7175562 A | 7/1995 |

(Continued)

OTHER PUBLICATIONS

Hargreaves, et al., U.S. Appl. No. 11/342,286, filed Jan. 27, 2006, 45 pages.

(Continued)

*Primary Examiner* — Daniel J Colilla
(74) *Attorney, Agent, or Firm* — Seed IP Law Group PLLC

(57) ABSTRACT

An adjustable keyboard includes a first keying module situated pivotably with respect to the second keying module for providing a keyboard having improved ergonomics and comfort, and promoting improved productivity of a user. In one embodiment, the first and the second keying modules are pivotably mounted on a base assembly having fixed opposing tenting angles. In one embodiment the first and the second keying modules are mounted on a pivot link assembly configured to pivot the keying modules with respect to each other. In one embodiment, the first and the second keying modules are configured to also laterally separate. In one embodiment, first and second lift modules space a portion of the first and the second keying modules, respectively, from a supporting surface to form opposing tenting angles.

17 Claims, 35 Drawing Sheets

(56) References Cited

U.S. PATENT DOCUMENTS

| | | |
|---|---|---|
| 2,040,248 A | 5/1936 | Dvorak et al. |
| 2,192,594 A | 3/1940 | Brand et al. |
| 3,929,216 A | 12/1975 | Einbinder |
| 3,945,482 A | 3/1976 | Einbinder |
| 3,990,565 A | 11/1976 | Felton et al. |
| 4,244,659 A | 1/1981 | Malt |
| 4,378,553 A | 3/1983 | McCall |
| 4,509,873 A | 4/1985 | Ryan |
| 4,597,681 A | 7/1986 | Hodges |
| 4,661,005 A | 4/1987 | Lahr |
| 4,897,649 A | 1/1990 | Stucki |
| 5,067,834 A | 11/1991 | Szmanda et al. |
| 5,073,050 A | 12/1991 | Andrews |
| 5,122,786 A | 6/1992 | Rader |
| 5,137,384 A | 8/1992 | Spencer et al. |
| 5,228,791 A | 7/1993 | Fort |
| 5,311,210 A | 5/1994 | O'Brien et al. |
| 5,322,967 A | 6/1994 | Matsuda |
| 5,334,997 A | 8/1994 | Scallon |
| 5,351,066 A | 9/1994 | Rucker et al. |
| 5,375,800 A | 12/1994 | Wilcox et al. |
| 5,388,921 A | 2/1995 | Chung |
| 5,424,728 A | 6/1995 | Goldstein |
| 5,454,652 A | 10/1995 | Huellemeier et al. |
| 5,456,542 A * | 10/1995 | Welch et al. ............ 400/492 |
| 5,457,452 A | 10/1995 | Skovronski |
| 5,466,078 A | 11/1995 | Szmanda et al. |
| 5,490,039 A | 2/1996 | Helms |
| 5,527,116 A | 6/1996 | Huellemeier et al. |
| 5,574,481 A | 11/1996 | Lee |
| 5,596,480 A | 1/1997 | Manser et al. |
| 5,612,691 A | 3/1997 | Murmann et al. |
| 5,612,718 A | 3/1997 | Bryan |
| 5,646,817 A | 7/1997 | Manser et al. |
| 5,653,543 A | 8/1997 | Abe |
| 5,669,722 A | 9/1997 | Overthun et al. |
| 5,754,395 A | 5/1998 | Hsu et al. |
| 5,769,551 A | 6/1998 | Tsai et al. |
| 5,826,839 A | 10/1998 | Chen |
| 5,841,635 A | 11/1998 | Sadler et al. |
| 5,904,327 A | 5/1999 | Cheng |
| 5,909,864 A | 6/1999 | Wang |
| 5,949,643 A | 9/1999 | Batio |
| 6,046,731 A | 4/2000 | Griffin et al. |
| 6,081,207 A | 6/2000 | Batio |
| 6,190,068 B1 | 2/2001 | Chao |
| 6,215,419 B1 | 4/2001 | Leman |
| 6,266,234 B1 | 7/2001 | Leman |
| 6,304,431 B1 * | 10/2001 | Kim .................. 361/679.09 |
| 6,320,519 B1 | 11/2001 | Hsu et al. |
| 6,641,316 B1 | 11/2003 | Goldstein et al. |
| 6,670,948 B2 | 12/2003 | Zarek |
| 6,883,984 B2 | 4/2005 | McLoone et al. |
| 6,984,081 B1 | 1/2006 | Goldstein et al. |
| 6,991,389 B2 | 1/2006 | Mochizuki et al. |
| 7,109,893 B2 | 9/2006 | Chen |
| 7,828,489 B1 | 11/2010 | Hargreaves et al. |
| 2001/0033763 A1 | 10/2001 | Goldstein et al. |
| 2005/0025549 A1 | 2/2005 | McLoone |
| 2005/0025550 A1 | 2/2005 | McLoone |
| 2005/0052832 A1 | 3/2005 | Monney et al. |
| 2005/0088414 A1 | 4/2005 | Adan et al. |
| 2005/0276651 A1 | 12/2005 | McLoone et al. |
| 2006/0043253 A1 | 3/2006 | Huang et al. |

FOREIGN PATENT DOCUMENTS

| | | | |
|---|---|---|---|
| JP | 09114569 A * | 5/1997 | ............ G06F 3/02 |
| WO | 92/18926 A1 | 10/1992 | |

OTHER PUBLICATIONS

Hedges et al., "Reinventing the Keyboard: Hunt 'n Peck Meets Hi-Tech," *The Times*, Monday, May 4, 1992, sec C, pp. 1-2.

Kraemer, "Human Engineering the Keyboard," *Human Factors*, 14(1):51-63, 1972.

Nakaseko et al., "Studies on Ergonomically Designed Alphanumeric Keyboards," *Human Factors*, 1985, pp. 175-187.

Zipp et al., "Keyboard Design Through Physiological Strain Measurements," *Applied Ergonomics*, pp. 117-122, Jun. 1983.

"Kinesis® MAXIM™ Adjustable Ergonomic Keyboard and Optional 10-key—User's Manual," Jun. 1997 Edition, pp. 1-21, Kinesis Corporation, Bothell, Washington.

Photographs of representative Kinesis® MAXIM™ keyboard, Kinesis Corporation, Bothell, Washington, first sold as early as Jun. 1997 (3 pages).

* cited by examiner

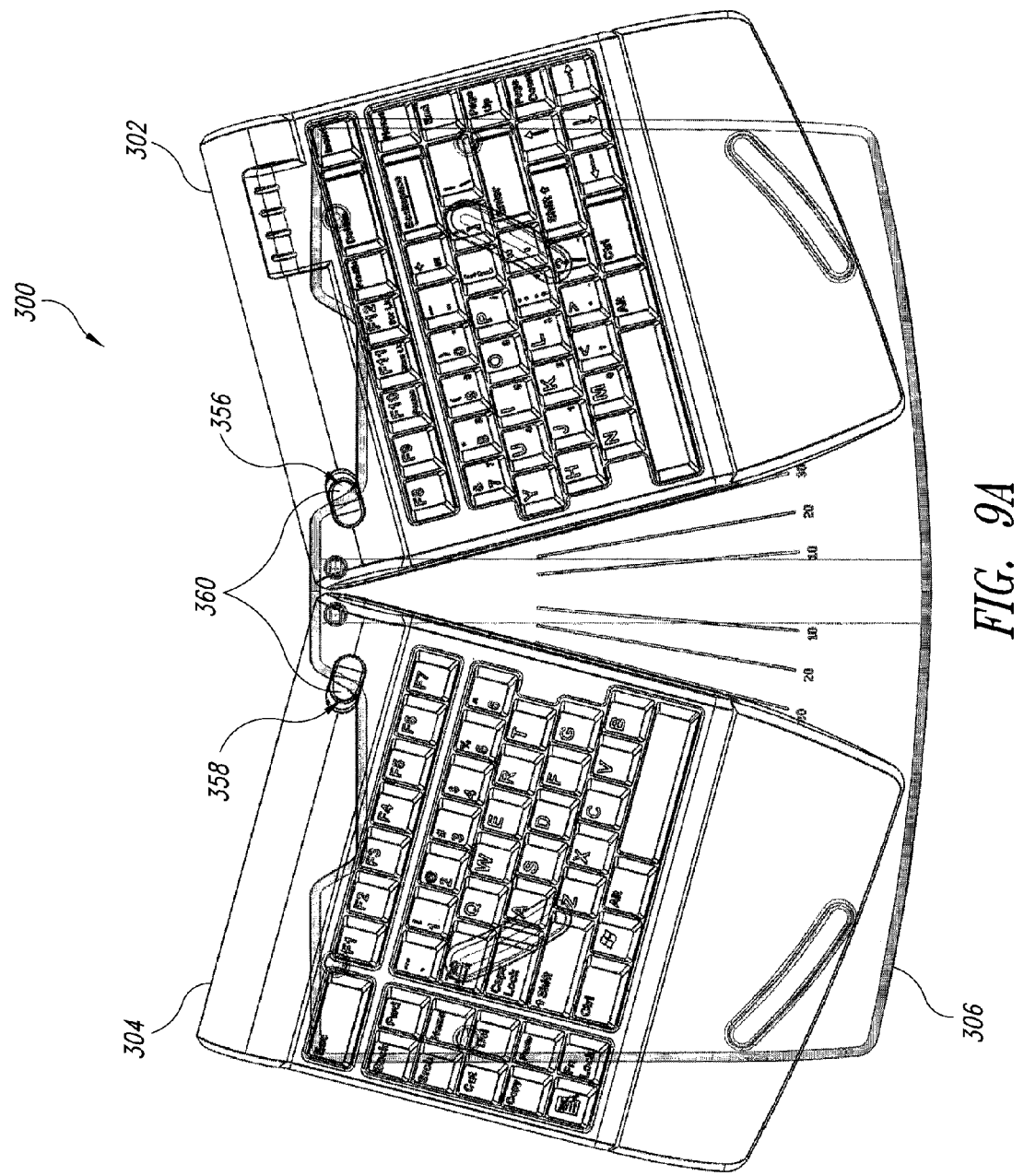

COMPUTER KEYBOARD WITH FIRST AND SECOND MODULES HAVING ADJUSTABLE ANGLE

CROSS-REFERENCE TO RELATED APPLICATION

This application is a continuation of U.S. patent application Ser. No. 11/788,773, filed Apr. 19, 2007, which claims the benefit under 35 U.S.C. §119(e) of U.S. Provisional Patent Application No. 60/793,528 filed Apr. 19, 2006 and U.S. Provisional Patent Application No. 60/872,522 filed Dec. 4, 2006, where these applications are incorporated herein by reference in their entireties.

BACKGROUND

1. Field

The present invention is generally related to keyboards, and more particularly, to an ergonomic and adjustable computer keyboard.

2. Description of the Related Art

Origins of the Typewriter and Numeric Keypad

As is generally known in the field, the typewriter was invented in the late 1800's. What is less well known is that in the early 1900's, the rapid pace of industrial innovation led to credible attempts at improving the typewriter keyboard, including splitting it into right and left segments (e.g. McNamara, 1921 and Tyberg, 1926) and streamlining the layout of the keys (and Dvorak, 1936). However, in spite of the numerous improvements invented in this time period, the commercial typewriter became standardized on the less effective Sholes' design without substantial changes to its geometry or the organization of the keys.

The static design of the typewriter was probably due in part to the rapidly established dependence of both workers and employers on standardized, and "portable" methods and equipment for written communications. Even though it was far from optimal by modern standards, the typewriter was a powerful productivity tool compared to writing longhand. It took substantial practice and skill to become proficient using a typewriter (in part because of its non-optimal design), and when students and job trainees attained proficiency, there were powerful social and economic forces resisting any changes that would have required retraining. Another phenomenon that retarded keyboard evolution in this period was the mechanical complexity of the devices. The equipment was limited by inflexible mechanical constraints.

The numeric keypad, which is an important part of the now-traditional computer keyboard, experienced an evolutionary path independent of the typewriter (see http://www.hamiltonsundstrandcorp.com/hsc/details/0,3797,CLI1_DIV22_ETI3212,00.html)

Perhaps because of the more diverse uses to which this type of device was subjected, or because it was simpler to learn and use a variety of configurations, or because some models were highly effective for specialized tasks, numeric keypads (adding machines) were produced in a variety of layouts through the early 1900s (see, e.g., http://www.webcom.com/calc/). The invention of the compact 10-key adding machine dates to 1914 (patented by David Sunstrand, see http://www.hamiltonsundstrandcorp.com/hsc/details/0,3797,CLI1_DIV22_ETI3212,00.html, but much larger adding machines with far more keys (with columns of numbers dedicated to each decimal position) were in use even into the 1970's (see http://www.tfh-berlin.de/~hamann/history/).

Computer Keyboards

The first computer terminal keyboards used the same typewriter-style arrangement of keys which had been adopted by earlier teletype machines, except for the addition of several new key actions which had not existed on the typewriter. Even with the invention of the personal computer, still more new key actions were simply added to the perimeter without changing the core typewriter-style layout. The first significant change to the keyboard occurred in 1983 with the introduction of a second-generation personal computer, the IBM XT, when the numeric keypad was added to the right side of the keyboard.

The second significant change to the keyboard was in 1986, coincident with the rapidly spreading usage of computers by the majority or office workers and the need for faster on-screen editing and navigation. New dedicated editing and navigational keys were added between the typewriter section and the numeric keypad section, making these new keyboards significantly wider still than their predecessors. This new version of the keyboard was called "enhanced" or "extended," and has become the de facto standard for virtually all computers. For the purposes of this discussion, this enhanced/extended keyboard design will be called the "traditional" computer keyboard.

Evolution of Computer Mousing

Douglas Englebart invented the computer mouse in 1968 and patented it in 1970 (see U.S. Pat. No. 3,541,541). However, it wasn't until the introduction of the first APPLE® computer in the 1980's that the computer mouse became an important medium for interacting with computers. And it wasn't until the introduction by MICROSOFT® in the 1990'S of the first WINDOWS®-based graphical user interface, after the evolution of the current "traditional" keyboard, that a majority of computer users began to be increasingly dependent on the mouse in their computer work.

Increasing dependence on the mouse created problems with the wide traditional computer keyboard. Since most people are right-handed, most computer users with wide traditional keyboards are forced to do extensive precision pointing and clicking while the right arm is extended beyond the right side of the keyboard. With the long-standard key spacing of 0.75 inch, the alphanumeric section of keys is approximately 11 inches wide, while the total width of a traditional computer keyboard is ~19 inches or more. Because all the non-alpha additions to the traditional typewriter keyboard are to the right side, the right side of the traditional keyboard is approximately 18 inches from the center of the alpha keys (effectively 36 inches in total width). Assuming a typical adult shoulder width of 16 to 20 inches, the average right-handed user (~80% of the population) would have to reach for the mouse approximately 8-9 inches farther out than the ideal front-of-shoulder location.

Alternative Computer Keyboards

Alternative computer (electronic) keyboard designs began appearing in the patent and scientific literature as early as 1964, some long before the invention of the personal computer (IBM, 1964; Kroemer, 1972; Einbinder 1975; Malt and Hobday 1982; Zipp et al., 1983; McCall, 1983; Nakeseko et al, 1985; Lahr, 1987). Zip et al. in 1983 documented some of the features associated with ergonomic keyboards. For example, they documented that a semi-split keyboard (with a center-back, vertically-oriented pivot point) optimally should have a front-opening range up to approximately 30 degrees; and that tenting is optimal in the range of 10 to 20 degrees, while tenting beyond 20 degrees would cause detrimental effects for most users and tenting less than 10 degrees would not provide maximal relaxation of the forearm muscles.

McCall and Lahr described fully-split keyboards mounted on the edge of a desk or to the arms of a chair. Lahr also described a measurement feature for quantitatively determining the position and orientation of the keying modules.

The first known commercial alternative keyboard was the Maltron keyboard, a fixed-split design with semi-concave key arrays, and with isolated thumb-operated keypads near the midline of the keyboard, which was produced and sold in the United Kingdom in the mid-1980s. The first known commercial letter-based alternative keyboard in the U.S. was the KINESIS® CONTOURED™ keyboard (similar to the Maltron), introduced in 1992. This was followed by the introduction of the Comfort keyboard (a fully-adjustable split keyboard mounted on a long desktop track) in late 1992 and the APPLE® semi-adjustable keyboard (two conventional keying modules linked by center-rear pivot point, with loosely-associated plastic palm rests), in early 1993.

Many of the published designs of the 1970's and 1980's (Kroemer, 1972; Einbinder, 1975; and Nakeseko et al., 1985) disclose partially split keyboards with right and left halves rotated to a fixed orientation around a pivot point near the center rear of the keyboard. Sometimes the center of the keyboard was tented slightly.

Some keyboard designs commercialized in the 1990's recognized the importance of combining separation, tenting, and palm rests with a narrow, largely symmetrical shape so the mouse could be positioned more or less directly in front of the shoulder (e.g., the fixed-split CONTOURED™ keyboard from Kinesis Corporation, and fixed or adjustable semi-split keyboards from Cherry Electrical Products, Fujitsu-Siemens, and Acer).

The biggest problem with alternative keyboard designs has been achieving a balance of effectiveness (for both comfort and productivity), ease of use (setup and adjustment), familiarity (standard key layout), general appearance, adaptation (minimal or no learning curve), and cost. Historically, more-effective products have had more features and more exotic features and typically have required greater adaptation time. This, in turn, has reduced acceptance. For any two products with equivalent effectiveness, the one which is easier to set up and use with reproducible settings will be preferred as well.

Accordingly, there is a need for a keyboard that is user-adjustable for providing a more comfortable keying position, accommodating reproducible position settings, and increasing adaptability and productivity while being easy to manufacture and operate.

BRIEF SUMMARY

According to one embodiment, an adjustable keyboard comprises a base assembly having a bottom portion configured to rest on a supporting surface, the base assembly having an upper surface with a raised central portion relative to opposing first and second lateral ends of the base assembly, to form opposing tenting angles with respect to the supporting surface during use; a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end; a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end; a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules; and a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules.

According to another embodiment, an adjustable keyboard comprises a first keying module having a proximal end and a distal end with respect to a user, an outer lateral end opposing an inner lateral end, an upper portion and a lower portion, the upper portion being configured to operatively retain a plurality of keys thereon; a second keying module having a proximal end and a distal end with respect to the user, an outer lateral end opposing an inner lateral end, an upper portion and a lower portion, the upper portion being configured to operatively retain a plurality of keys thereon; and a pivot link assembly configured to pivotably couple the first keying module to the second keying module toward the distal ends thereof to allow for separation of the proximal end of the first keying module from the proximal end of the second keying module to form a desired splay angle between the respective inner lateral ends of the first and the second keying modules.

According to yet another embodiment, an adjustable keyboard comprises a first keying module having a proximal end and a distal end with respect to a user, an outer lateral end opposing an inner lateral end, an upper portion and a lower portion, the upper portion being configured to operatively retain a plurality of keys thereon; a second keying module having a proximal end and a distal end with respect to the user, an outer lateral end opposing an inner lateral end, an upper portion and a lower portion, the upper portion being configured to operatively retain a plurality of keys thereon; a first lift module configured to be fixedly coupled with respect to the lower portion of the first keying module toward the inner lateral end of the first keying module for spacing the inner lateral end from a resting surface and configured to form at least one tenting angle between the lower portion of the first keying module and the resting surface, the tenting angle diverging from the outer lateral end of the first keying module toward the inner lateral end; and a second lift module configured to be fixedly couple with respect to the lower portion of the second keying module toward the inner lateral end of the second keying module for spacing the inner lateral end from a resting surface and configured to form at least one tenting angle between the lower portion of the second keying module and the resting surface, the tenting angle diverging from the outer lateral end of the second keying module toward the inner lateral end.

BRIEF DESCRIPTION OF THE SEVERAL VIEWS OF THE DRAWING(S)

Figure 9B:
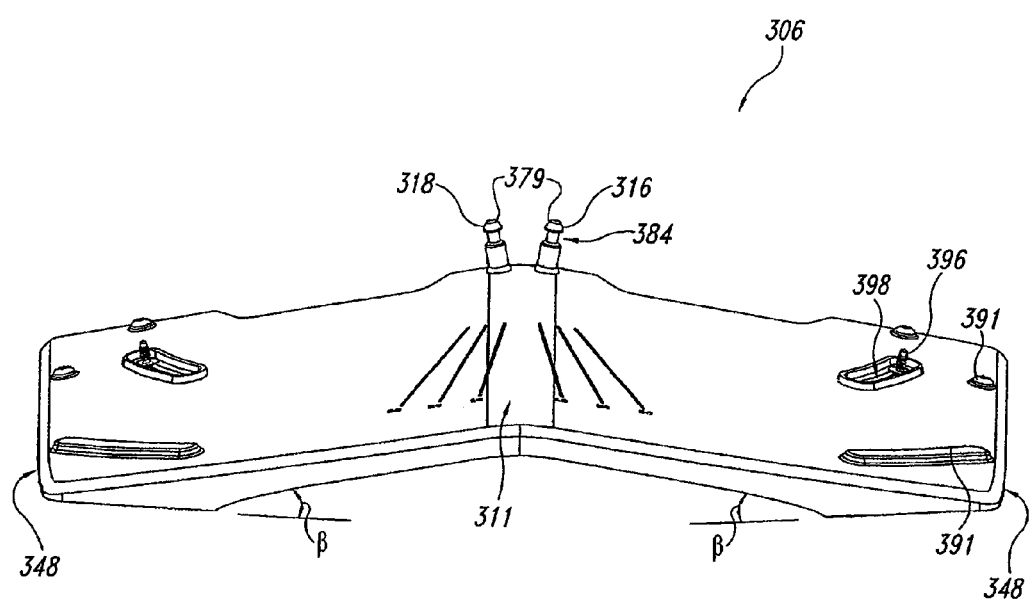
FIG. 9A is a plan view of an adjustable keyboard according to yet another embodiment.
Figure 10A:
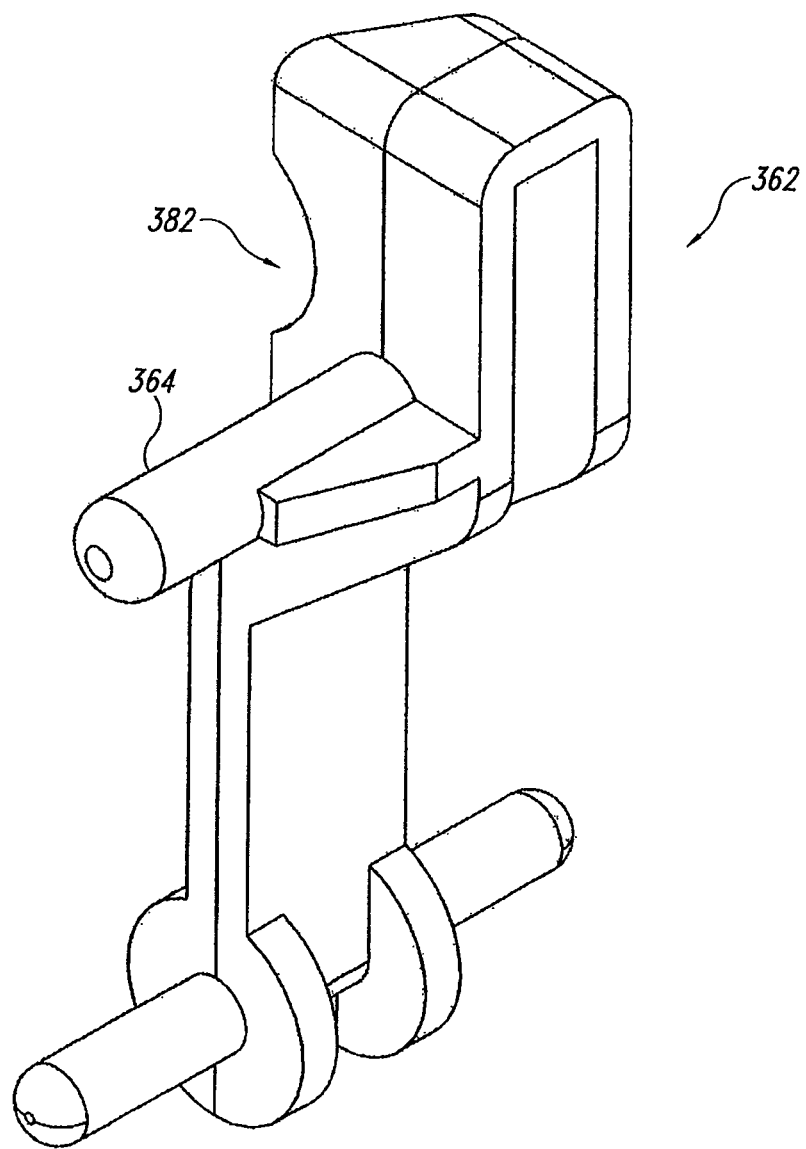
Figure 10B:
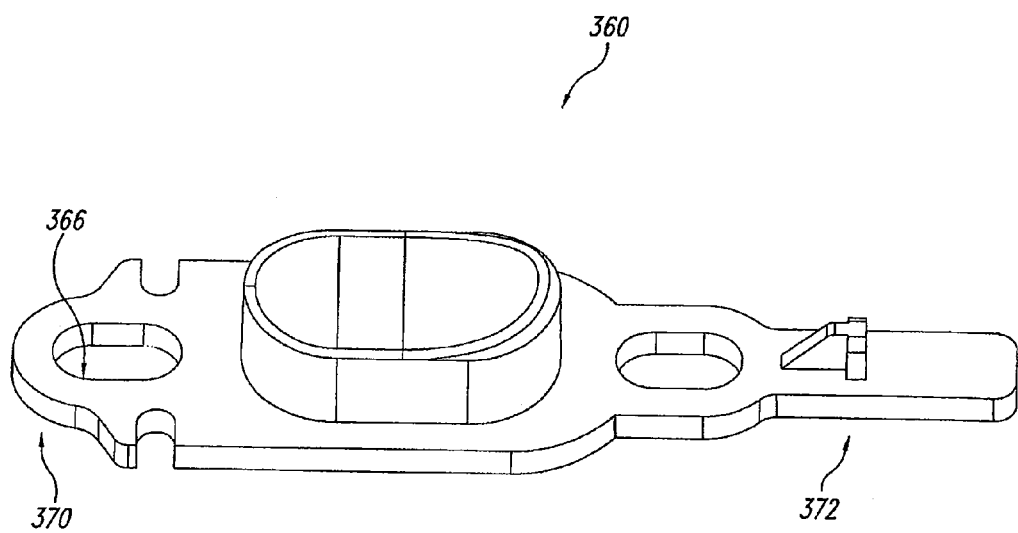

FIGS. 9B, 10A, and 10B are isometric views of respective portions of the adjustable keyboard of FIG. 9A.

Figure 11A:
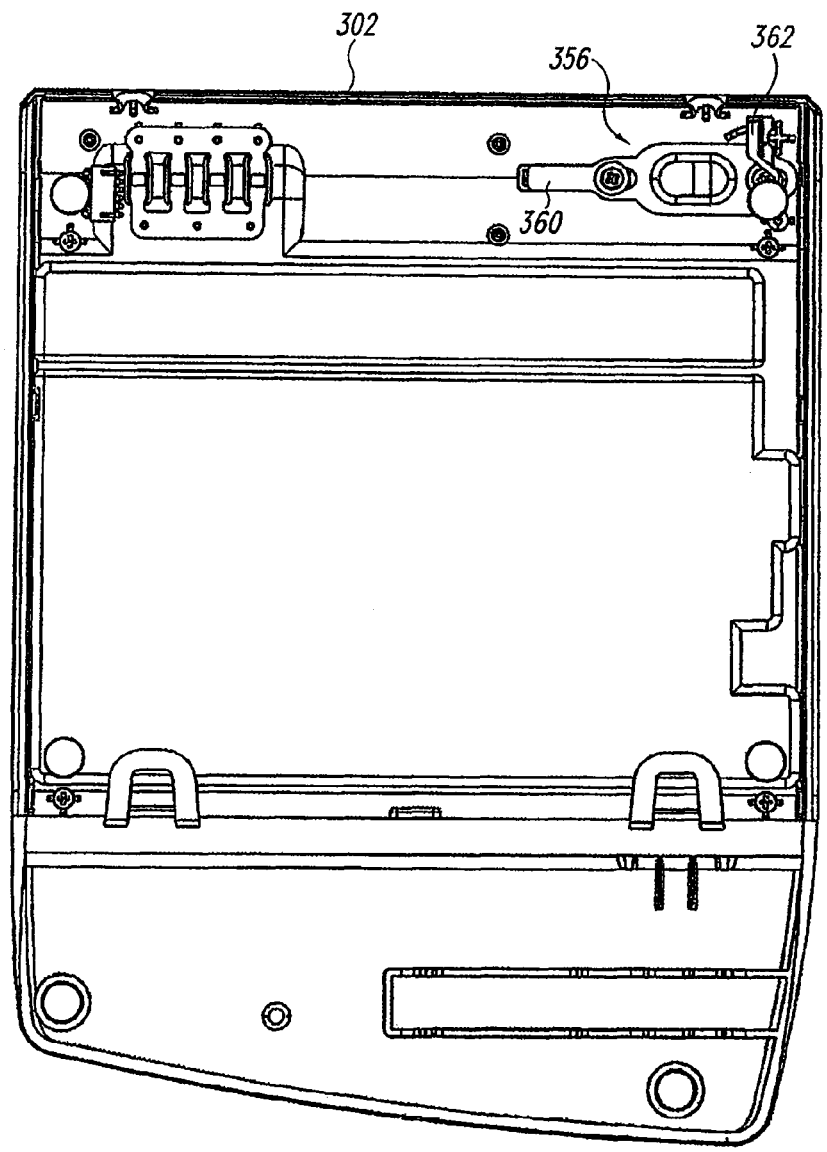
Figure 11B:
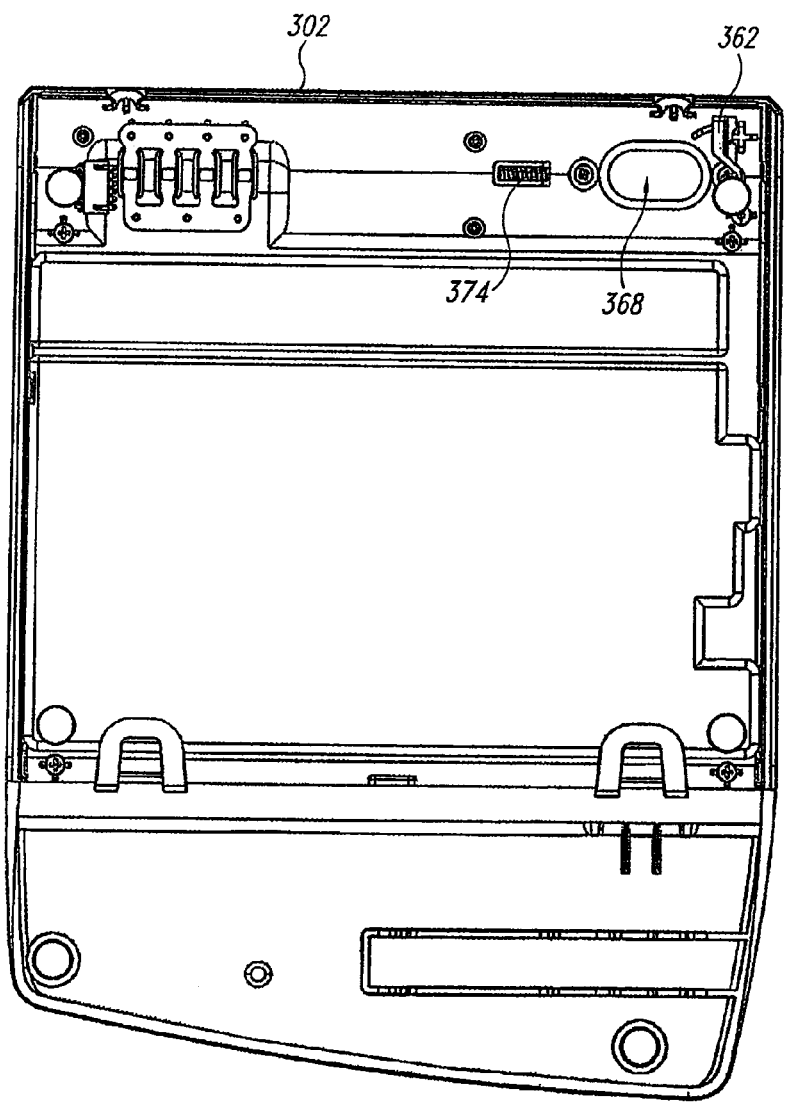
Figure 12A:
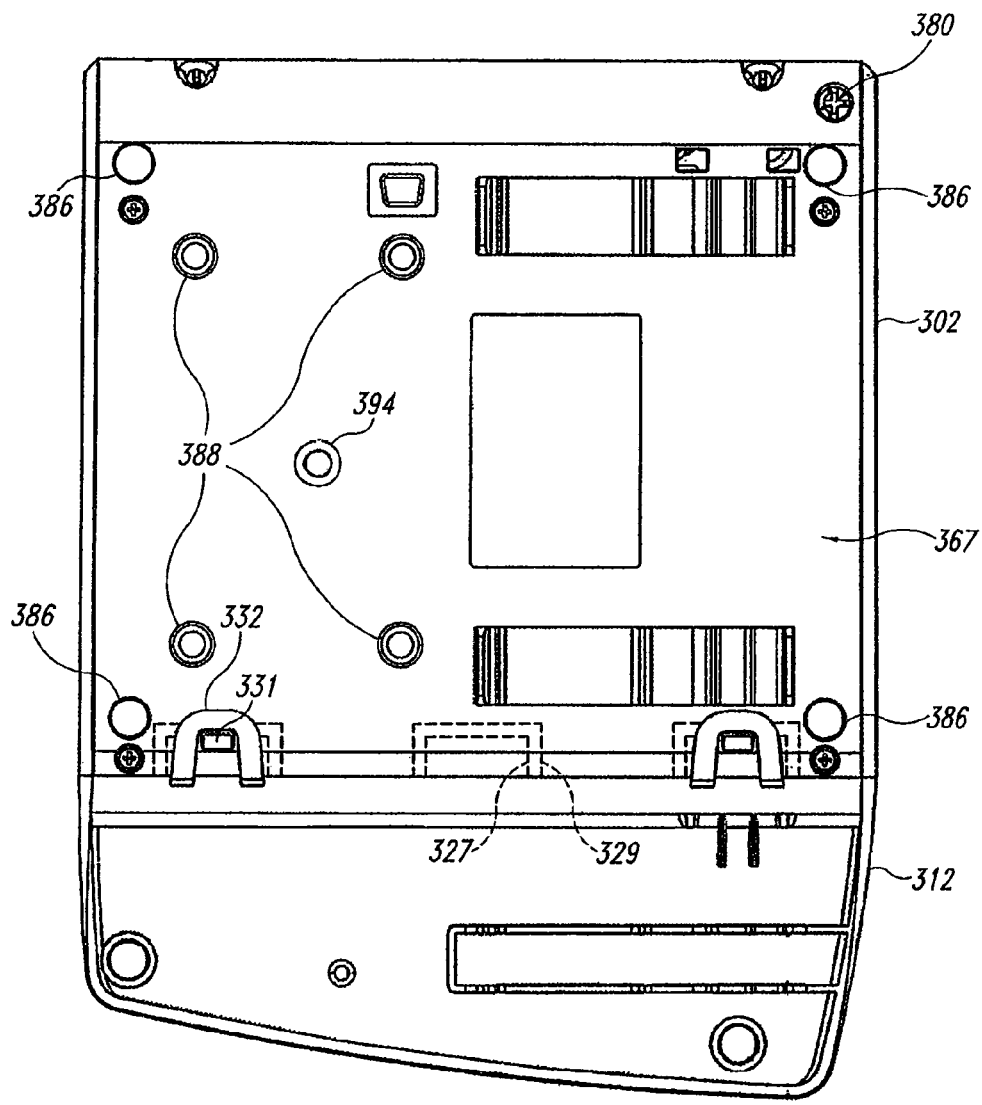

FIGS. 11A, 11B, and 12A are bottom views of a portion of the adjustable Keyboard of FIG. 9A.

Figure 12B:
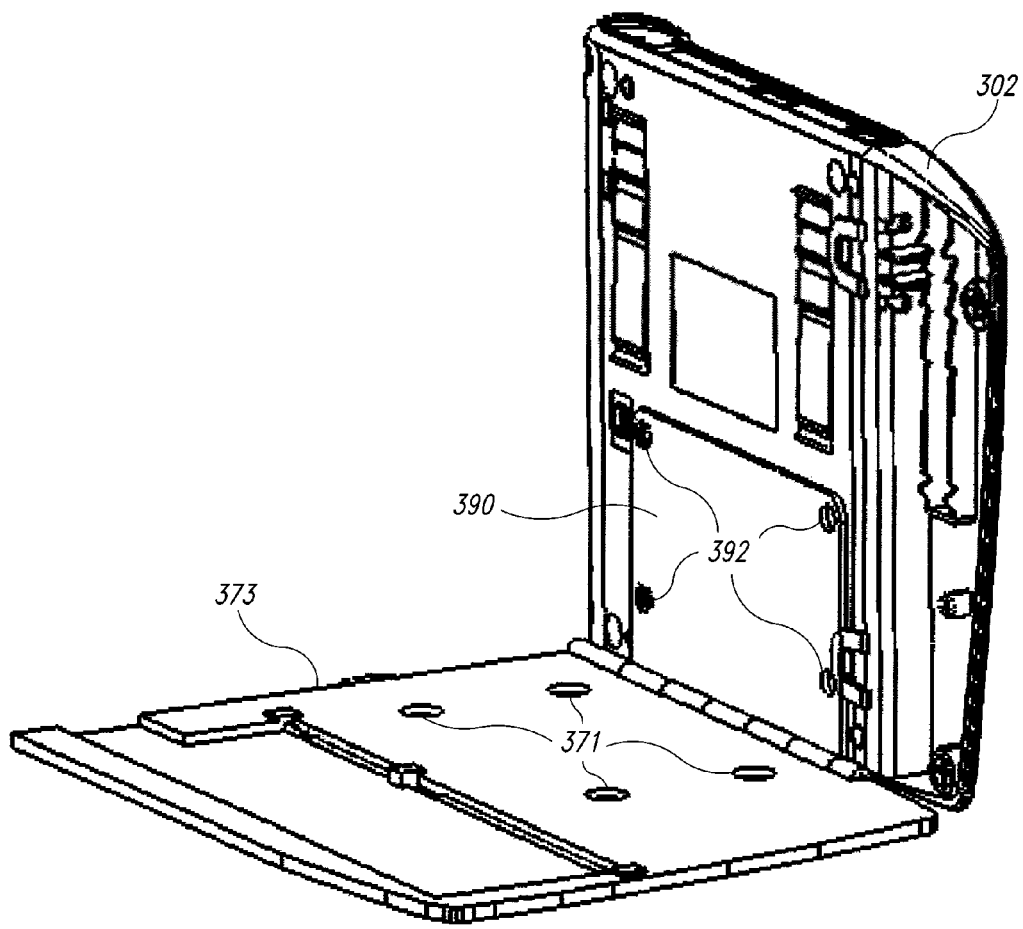

FIG. 12B is an isometric view of a portion of the adjustable keyboard of FIG. 9A according to one aspect.

Figure 12C:
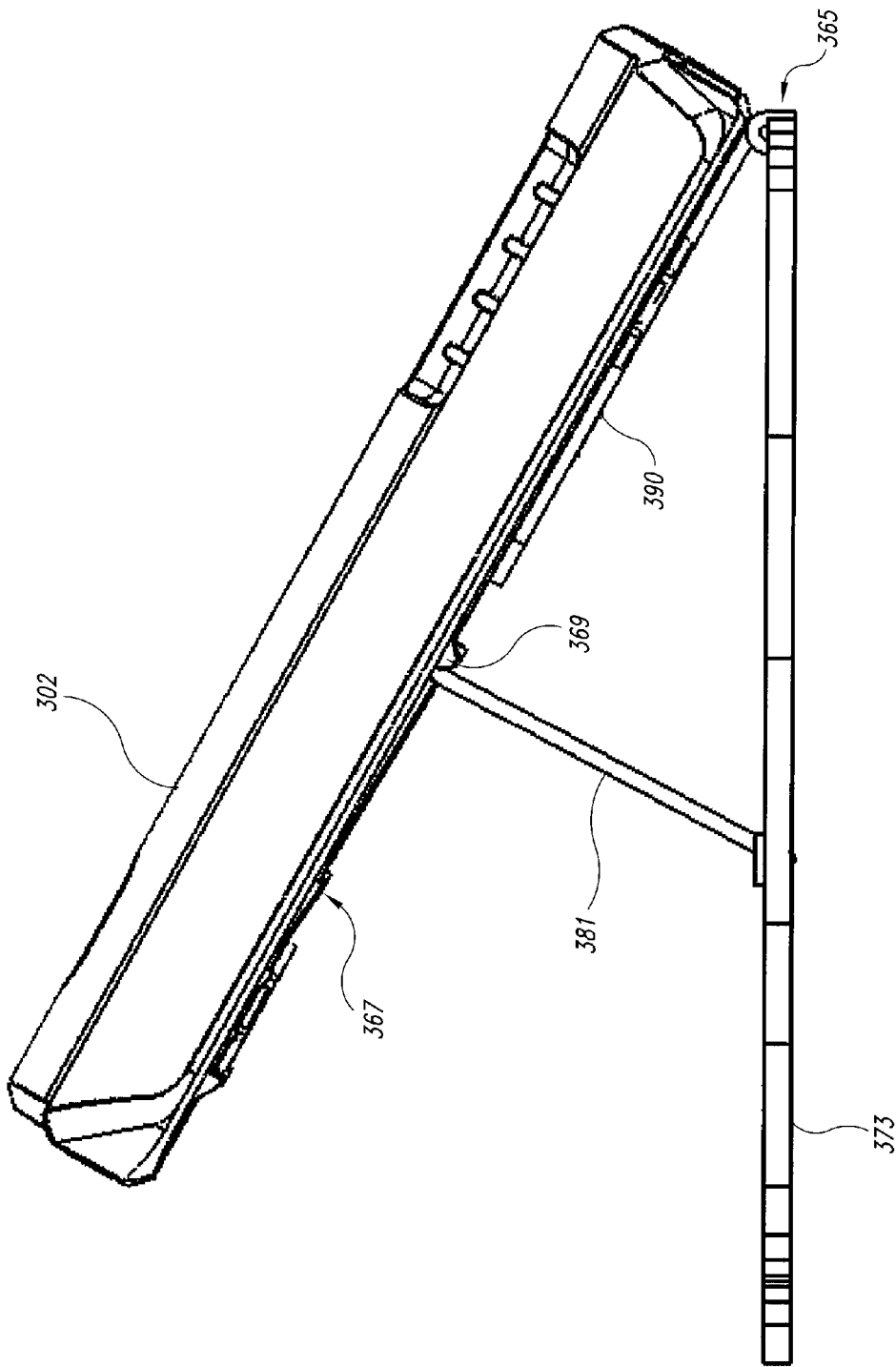

FIG. 12C is a front view of a portion of the adjustable keyboard of FIG. 9A according to one aspect.

Figure 13A:
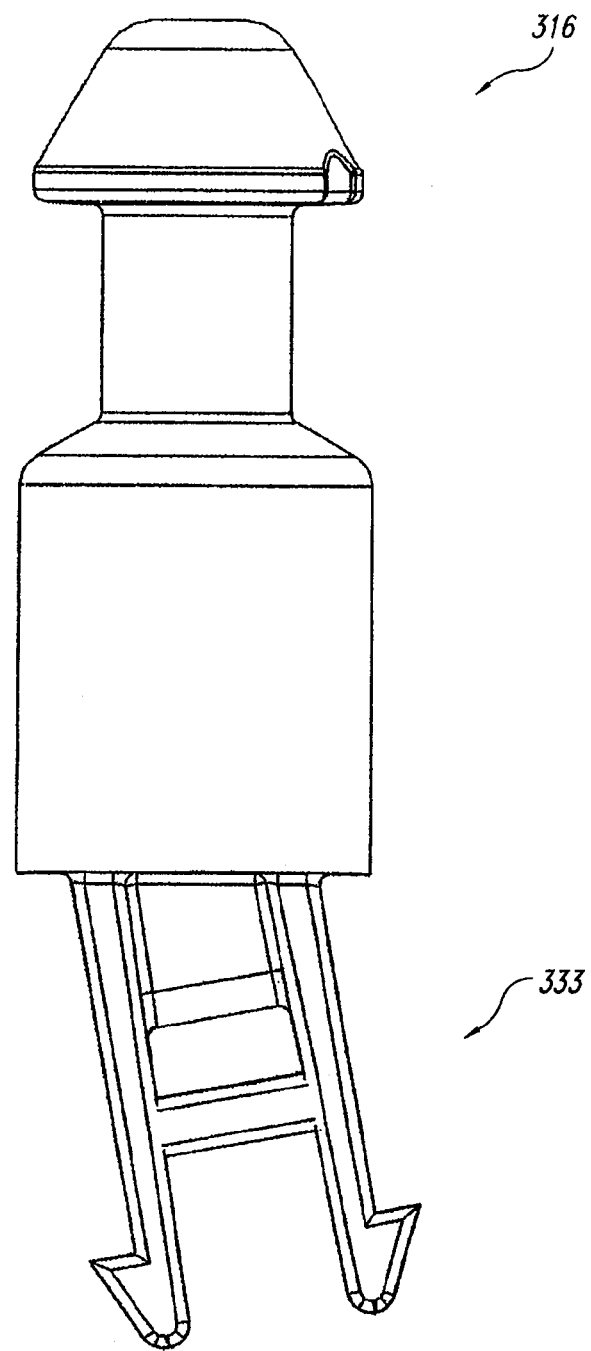

FIG. 13A is a side view of a portion of the adjustable keyboard of FIG. 9A.

Figure 13B:
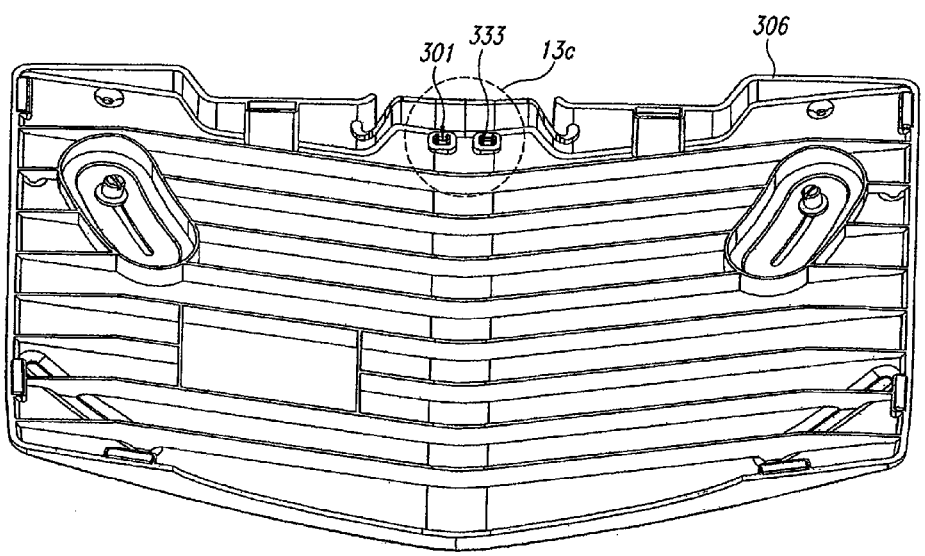
Figure 13C:
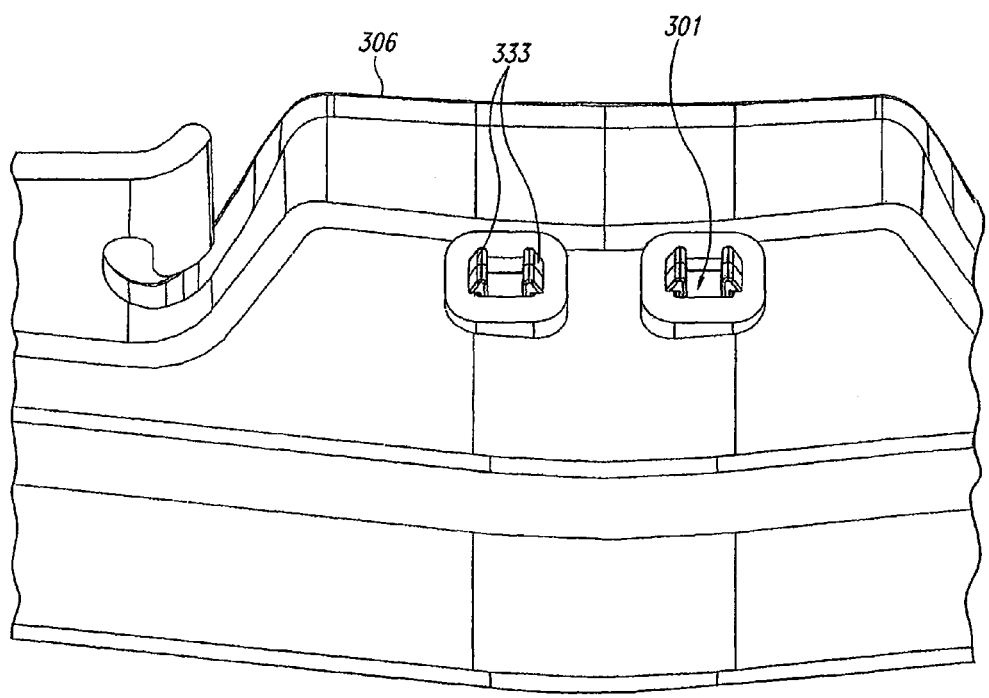

FIGS. 13B and 13C are isometric views of a portion of the adjustable keyboard of FIG. 9A.

Figure 14:
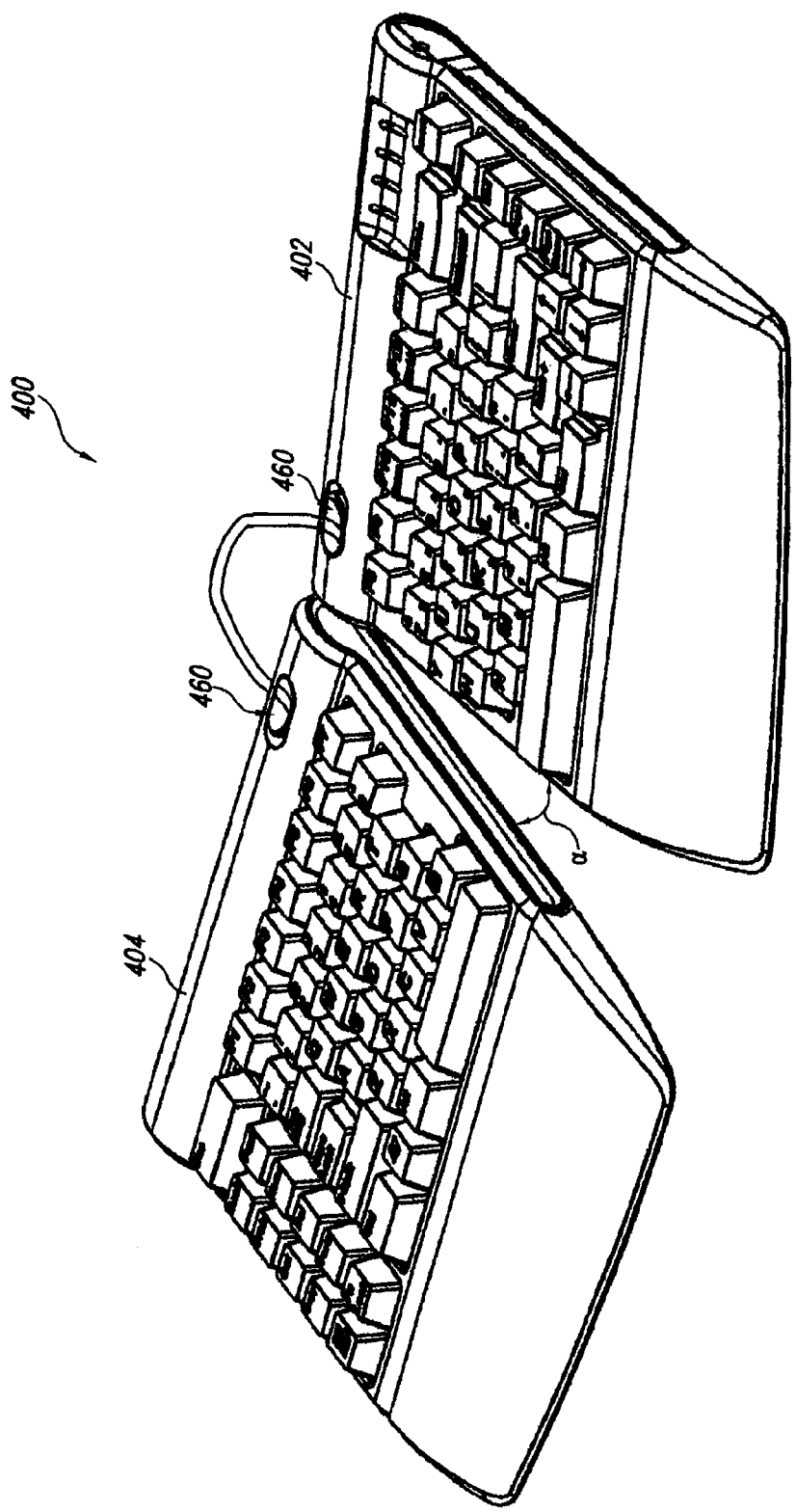

FIG. 14 is an isometric view of a portion of the adjustable keyboard according to still another embodiment.

Figure 15:
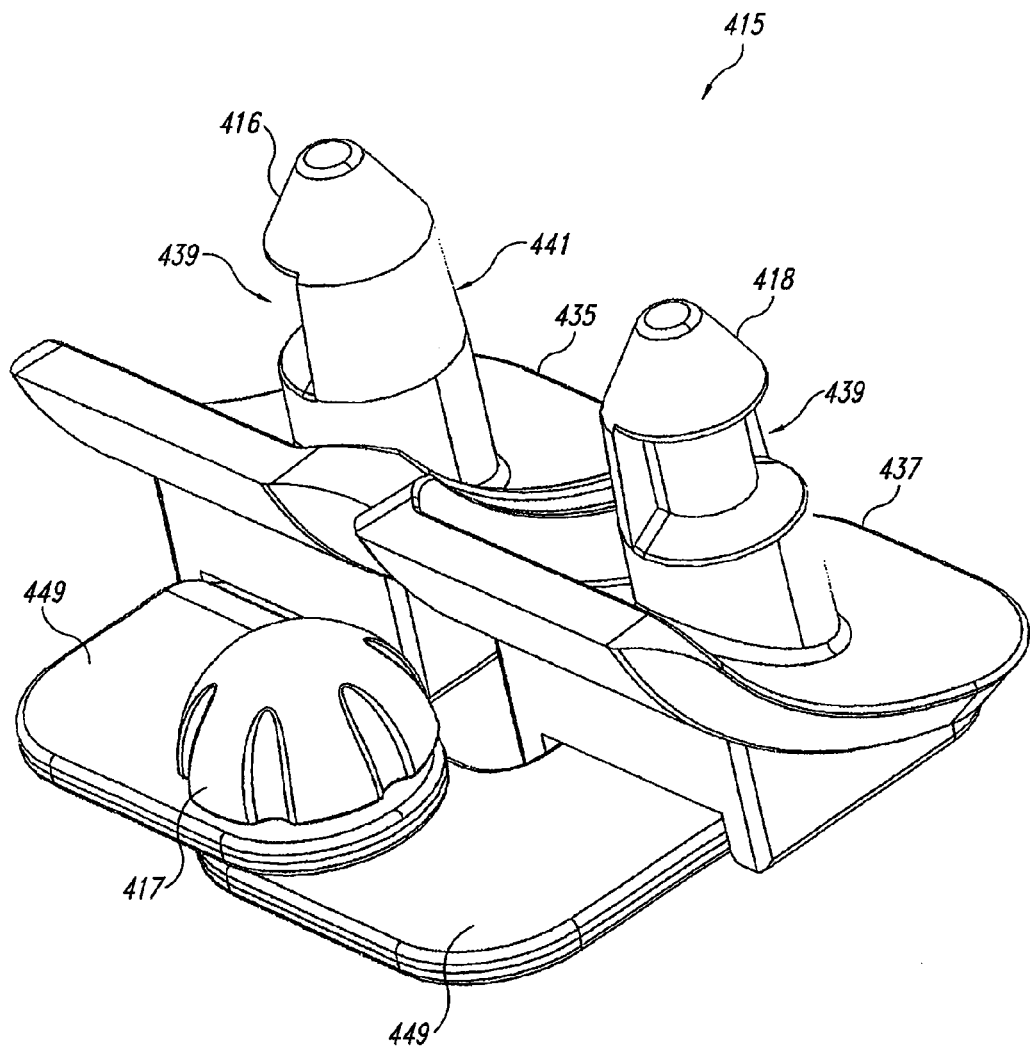

FIG. 15 is an isometric view of a portion of the adjustable keyboard of FIG. 14.

Figure 16:
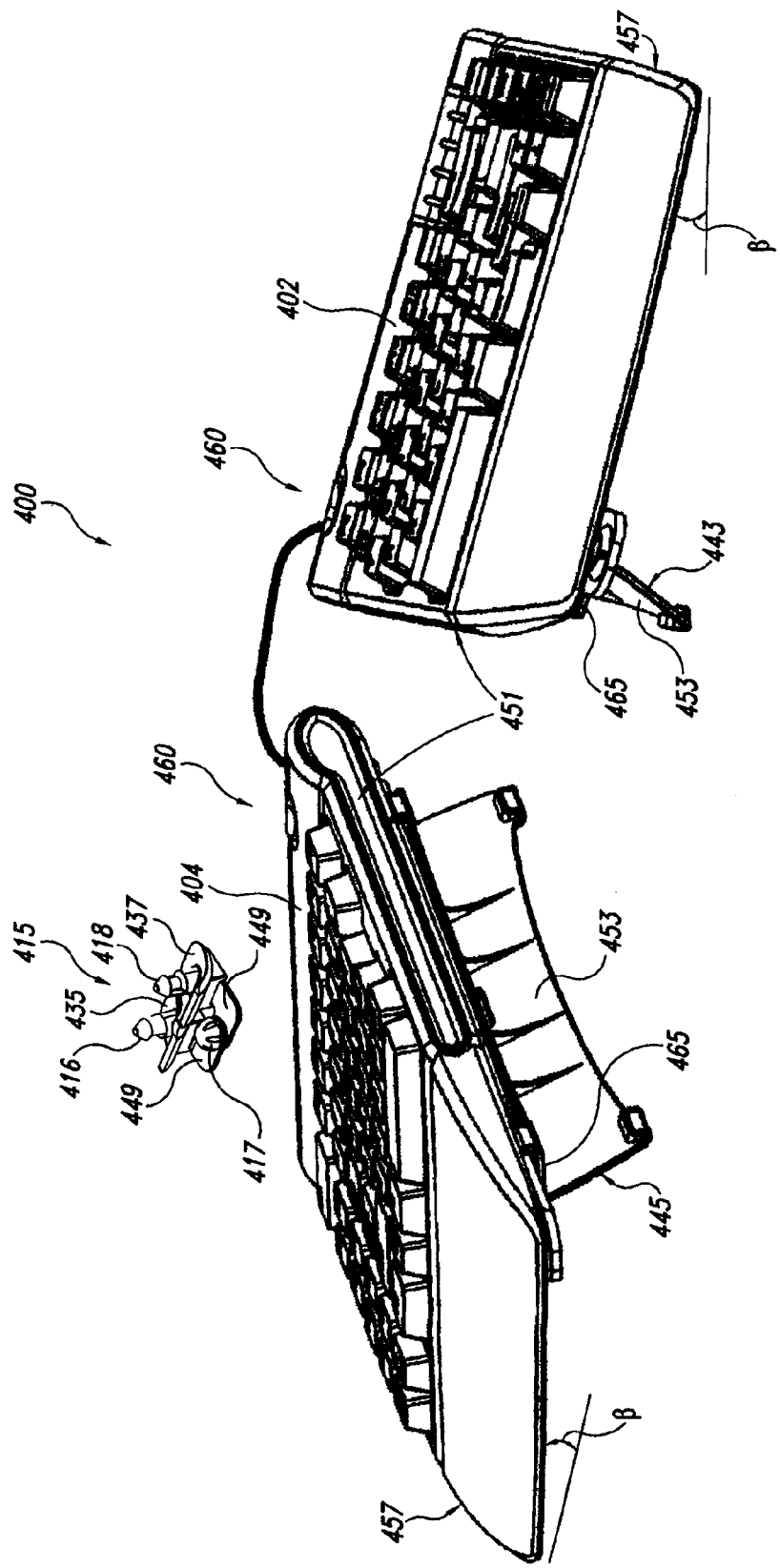

FIG. 16 is an isometric view of an adjustable keyboard according to another embodiment in a first state.

Figure 17A:
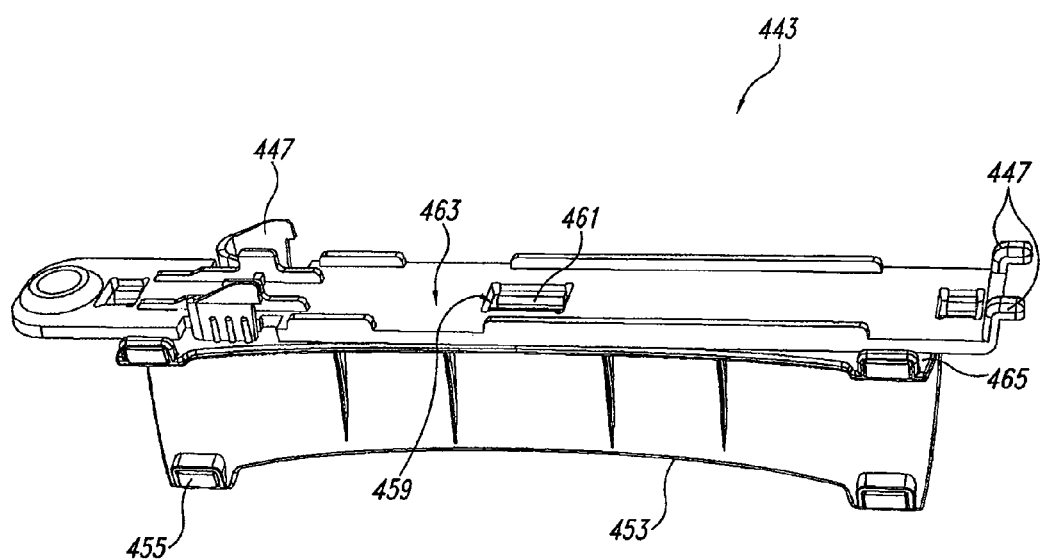

FIG. 17A is a side view of a portion of the adjustable keyboard of FIG. 16.

Figure 17B:
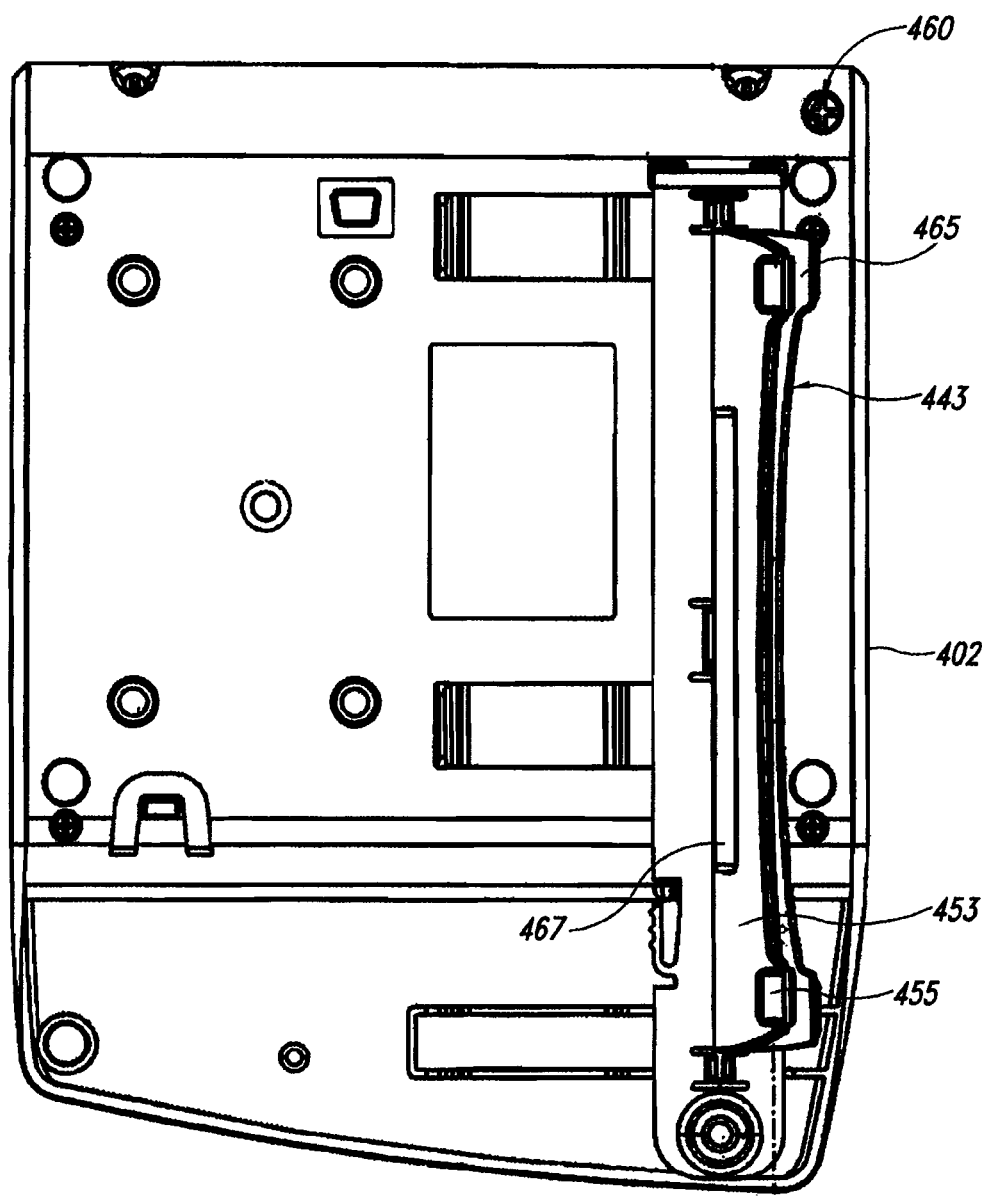

FIG. 17B is a bottom view of a portion of the adjustable keyboard of FIG. 16.

Figure 17C:
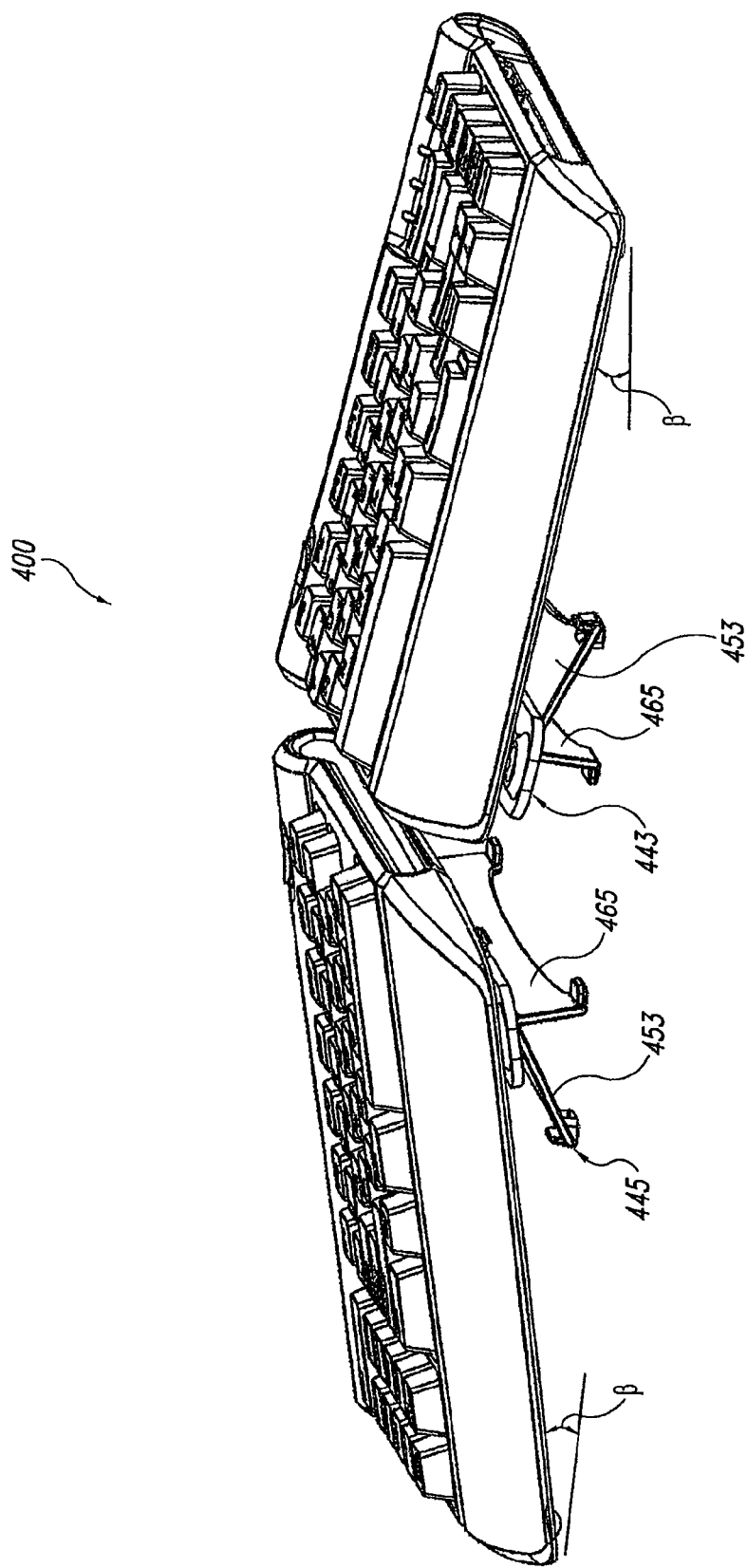

FIG. 17C is an isometric view of the adjustable keyboard of FIG. 16 in a second state.

Figure 18:
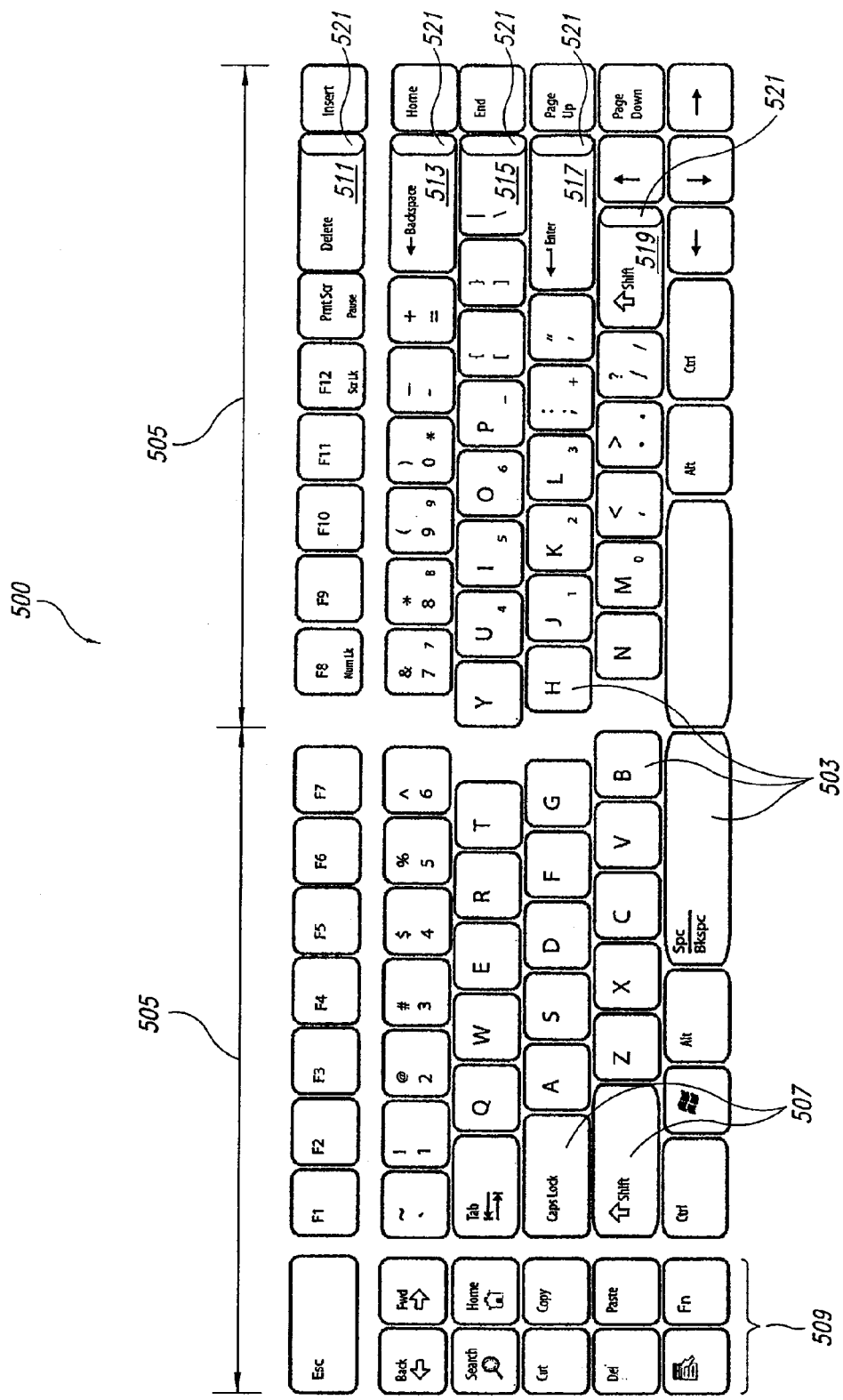

FIG. 18 is a plan view of a key layout for a keyboard according to another embodiment.

DETAILED DESCRIPTION

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
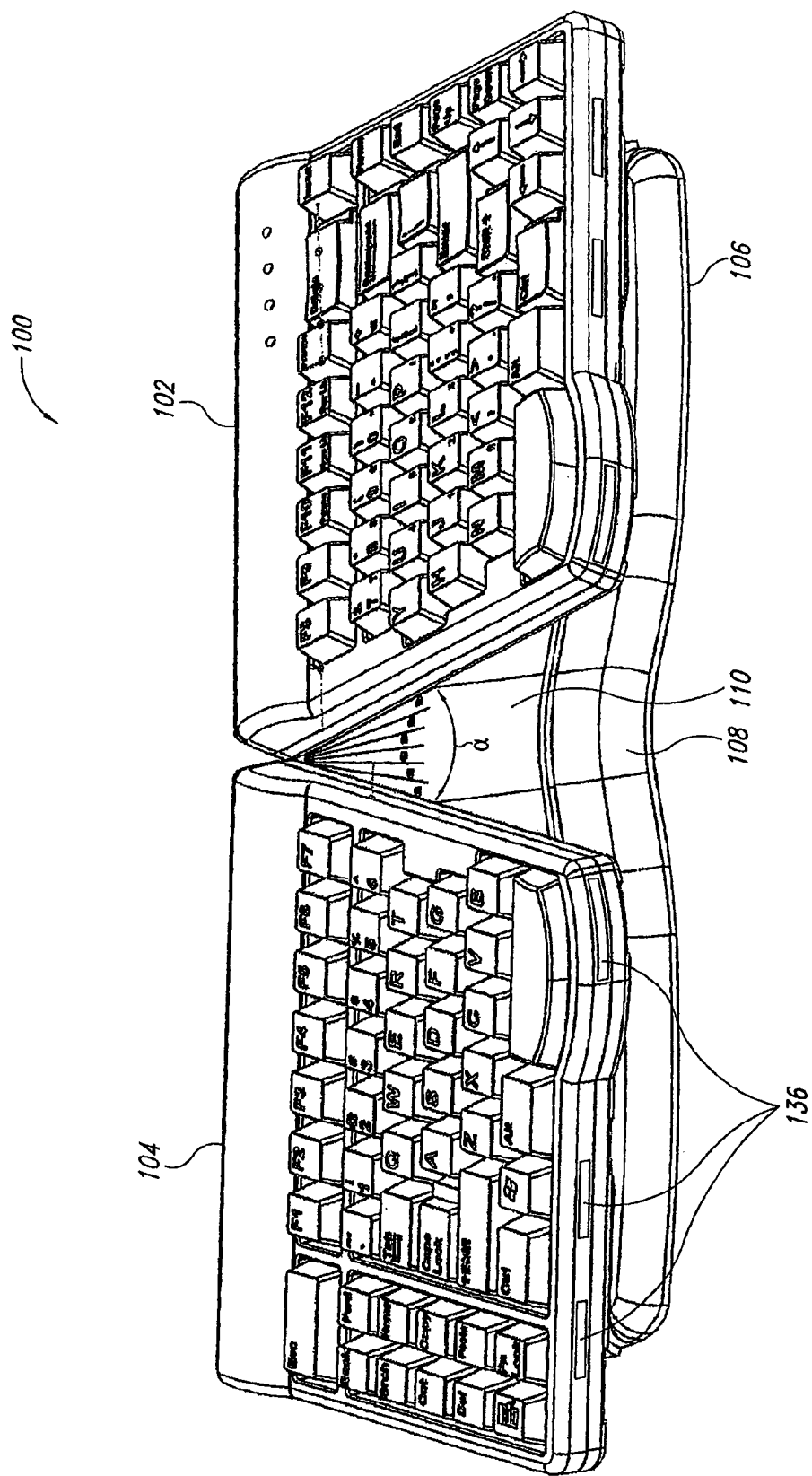
FIG. 1 is an isometric view of an adjustable keyboard according to one embodiment in a first state.

FIG. 1 illustrates one embodiment of the present invention, in which an adjustable keyboard 100 comprises a first keying module 102 and a second keying module 104, at least one of which is pivotably mounted on a base assembly 106, allowing it to pivot toward and away from the other of the first and the second keying modules 102, 104. In one embodiment, both the first and the second keying modules 102, 104 are pivotably mounted on the base assembly 106. The base assembly 106 includes a proximal base module 108 slidably coupled to a distal base module 110, with respect to a user of the adjustable keyboard 100. In one embodiment, the front base module 108 may slide rearward to a position such that a portion thereof overlaps or slides under a portion of the distal base module 110, as illustrated in FIG. 1.

Figure 2A:
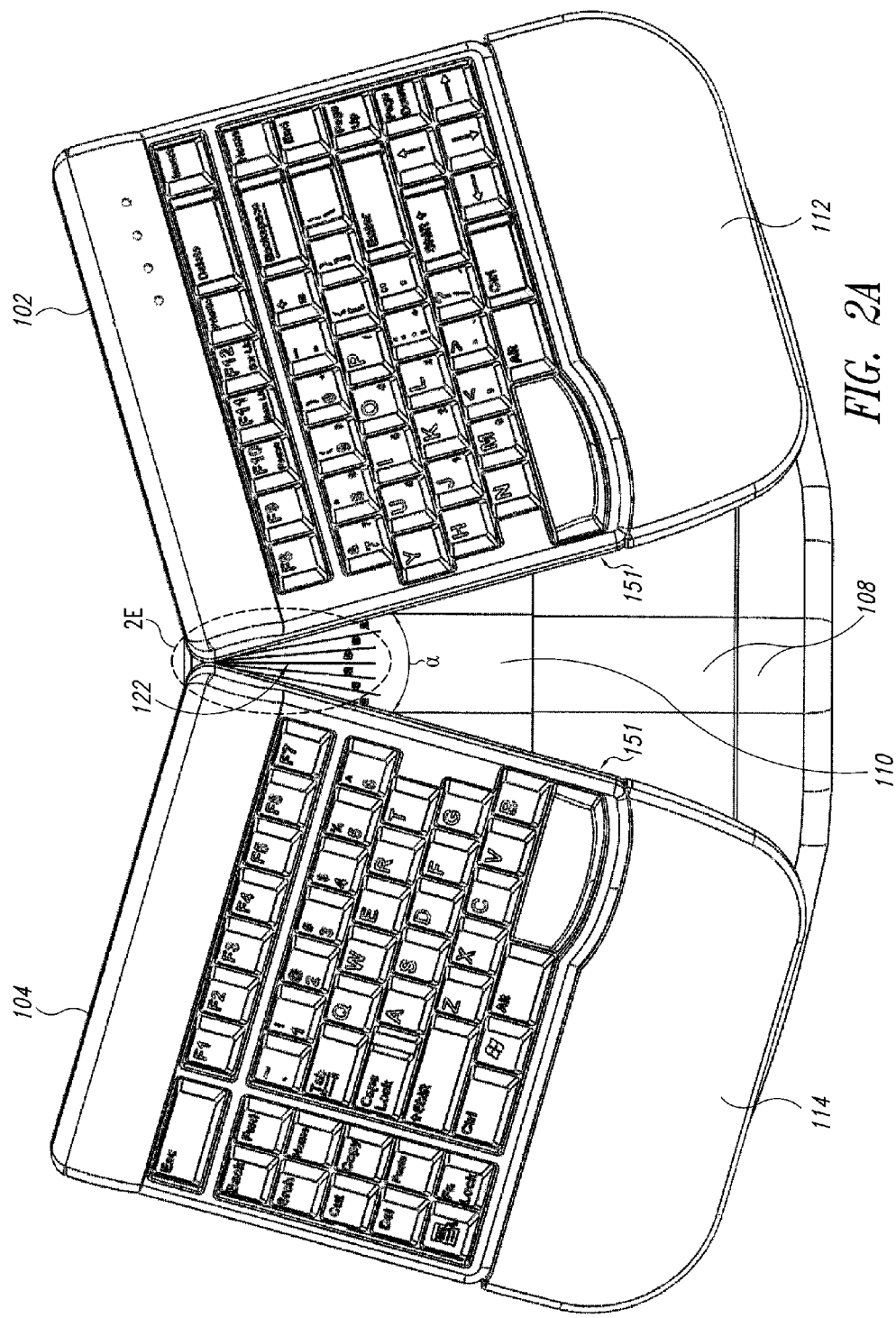
FIG. 2A is a plan view of the adjustable keyboard of FIG. 1 in a second state.

As illustrated in FIG. 2A, the adjustable keyboard 100 may comprise optional first and second palm rests 112, 114 removably coupled to the first and the second keying modules 102, 104, respectively, toward a proximal end thereof, with respect to the user of the adjustable keyboard 100. Since the proximal base module 108 is slidably coupled to the distal base module 110, the user can selectively extend the proximal base module 108, thus providing additional support to the first and the second palm rests 112, 114, when installed. When the palm rests 112, 114 are removed, the proximal base module 108 may be pushed back to slide under the distal base module 110 to reduce the work space occupied by the extended proximal base module 108. One of ordinary skill in the art will appreciate that instead of the two palm rests 112, 114, a unitary palm rest that is removable or fixed can be used. Also, the first and the second palm rests 112, 114 may be fixedly attached to the first and the second keying modules 102, 104.

Figure 2B:
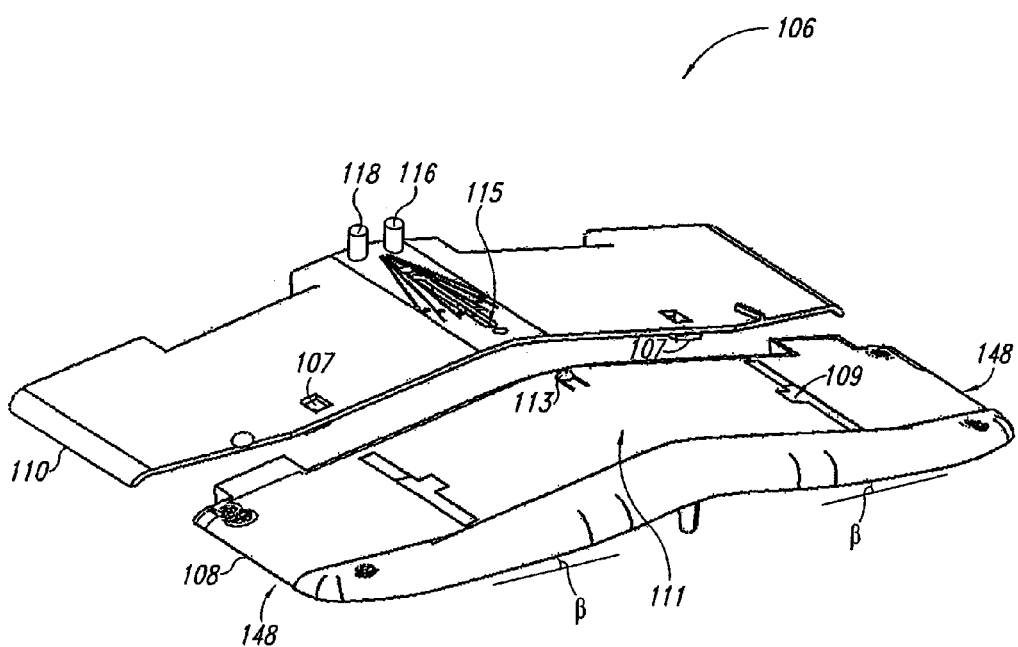
FIGS. 2B-2E are isometric views of respective portions of the adjustable keyboard of FIG. 1.

FIG. 2B illustrates the first base module 108 and the second base module 110 in a pre-assembled state. The first and the second base modules 108, 110 may be slidably coupled via at least one set of complementing first and second structures 107, 109, which when engaged allow one of the first and the second base modules 108, 110 to slide with respect to the other of the first and the second base modules 110, 108. For example, as shown in the illustrated embodiment of FIG. 2B, the first structure 107 can be a protrusion or tab 107 configured to slidably engage the second structure 109, which can be a slot that is elongated in a direction along which the first base module 108 may slide. The embodiment of FIG. 2B includes two sets of complementing first and second structures 107, 109. Other configurations are possible.

Additionally, or alternatively, the first base module 108 may include an alignment pin 113 configured to slidably engage an alignment slot 115 formed in the second base module 110. The alignment pin 113 and the alignment slot 115 may be formed toward a lateral central portion 111 of the base assembly 106. Furthermore, the illustrated base assembly 106 includes a raised portion formed toward the lateral central portion 111, which extends from proximate the proximal end to proximate the distal end of the base assembly with respect to the user. Therefore, an upper surface of the base assembly 106 laterally diverges from the lateral central portion 111 toward opposing lateral ends 148 of the base assembly 106 for forming opposing tenting angles β. Accordingly, the base assembly 106 typically elevates central (or medial) portions of the keying modules 102, 104 while maintaining outer lateral ends of the keying modules 102, 104, laterally opposing the inner lateral ends 151, lower than the inner lateral ends 151. However, the outer lateral ends typically are not so low that they contact a work surface when a maximum pivoting of the first and the second keying modules 102, 104, is selected in such a way as to change an attitude of the keying modules or make the unstable.

Figure 2C:
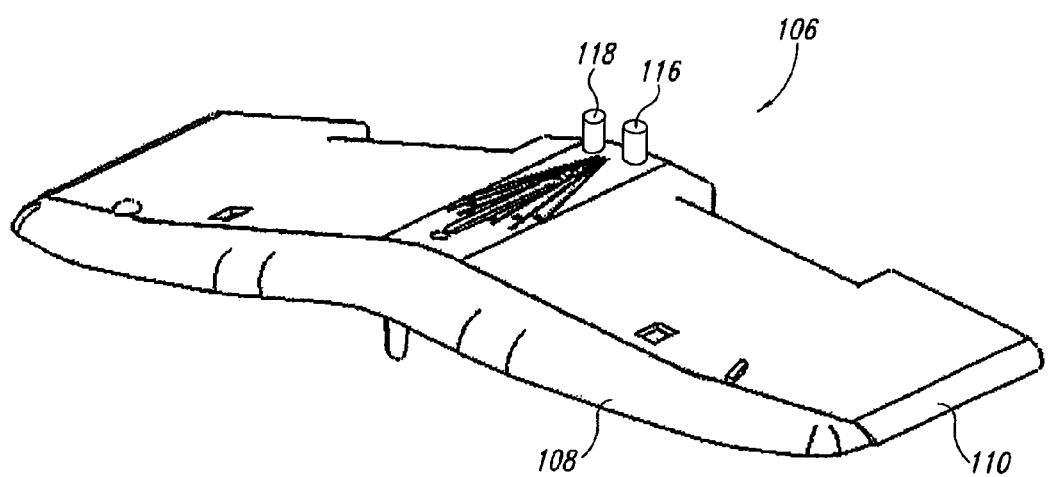
Figure 2D:
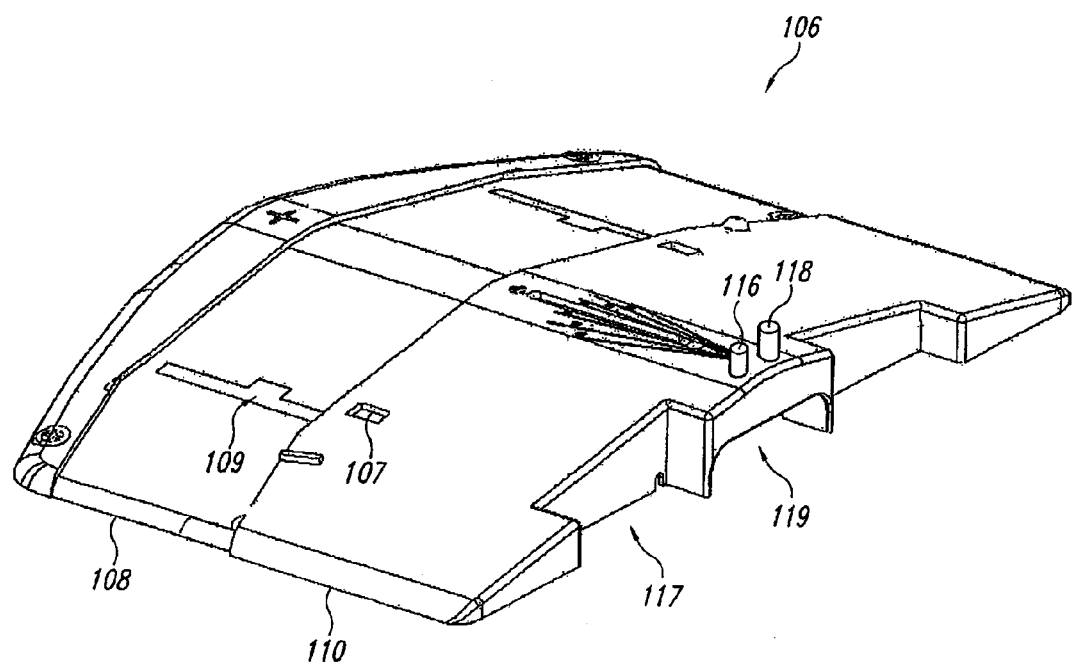

FIGS. 2C and 2D illustrate the first base module 108 and the second base module 110 in an assembled state. FIG. 2C illustrates the base assembly 106 in a compressed state before the first base module 108 is extended to support the first and the second palm rests 112, 114 (FIG. 2A). FIG. 2D illustrates the base assembly 106 in an extended state after the protrusion 107 travels and/or slides along the slot 109. As illustrated in FIG. 2D, the second base module 110 may include at least one recessed portion 117 configured to facilitate grasping the first or the second keying modules 102, 104 and lifting the grasped keying module 102, 104 away from the base assembly 106 when the keying module is mounted on the base assembly 106 as will be described in more detail below. Additionally, or alternatively, the second base module 110 may include a rear holding portion 119, such as a recess or a handle, configured to facilitate lifting the entire adjustable keyboard 100 (FIGS. 1 and 2A) and/or the base assembly 106.

Figure 3A:
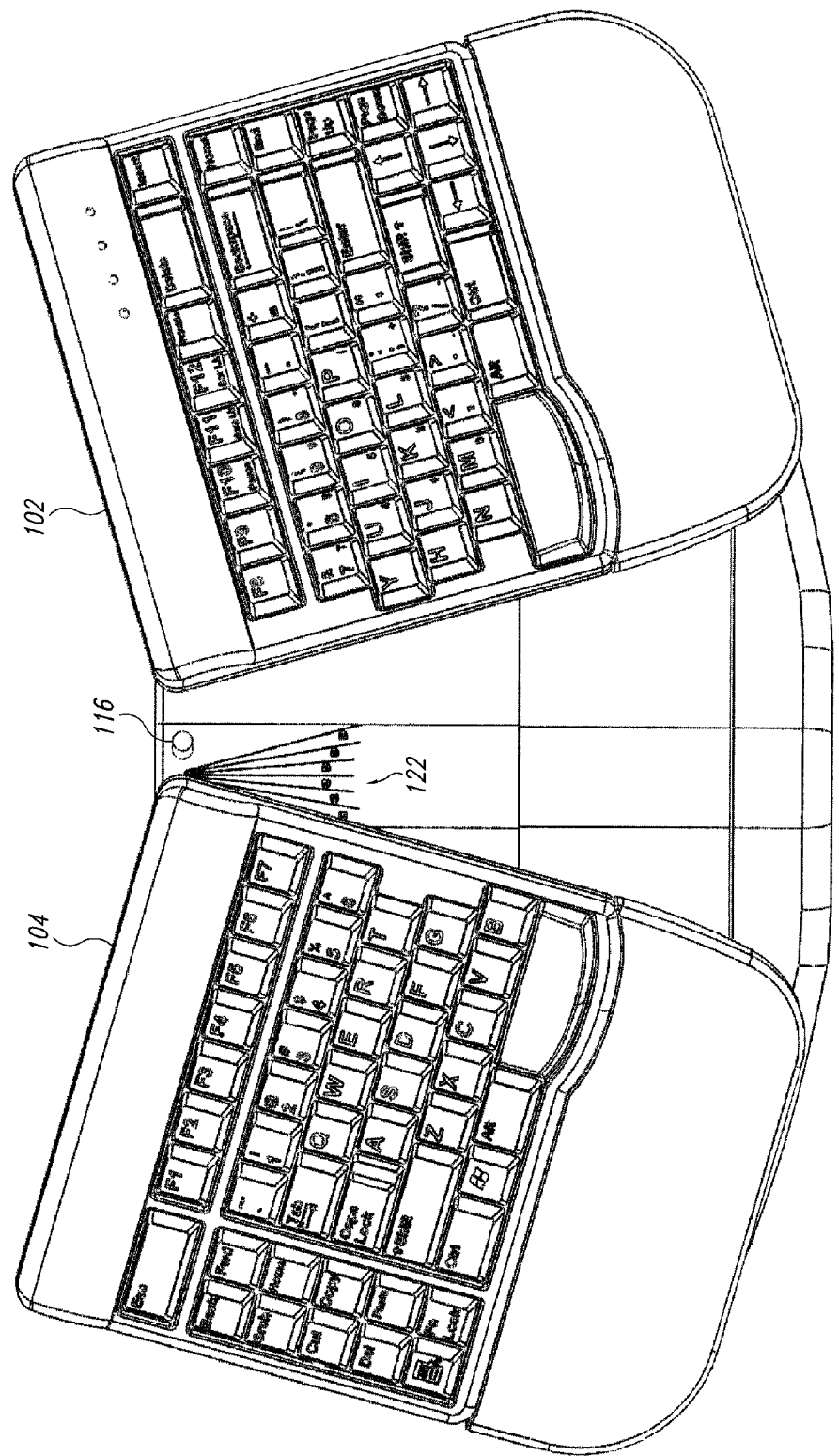
FIG. 3A is a plan view of the adjustable keyboard of FIG. 1 with one keying module shifted.

As illustrated in FIGS. 2B and 2C, in one embodiment, the adjustable keyboard 100 comprises a first pivot pin 116 and a second pivot pin 118 for pivotably mounting the first and the second keying modules 102, 104, respectively. FIG. 3A illustrates the adjustable keyboard 100 of FIG. 1 with the first keying module 102 dismounted to reveal the first pivot pin 116. The first and the second pivot pins 116, 118 pivotably mount the first and the second keying modules 102, 104 to the base assembly 106 and allow the user to adjust a front opening or splay angle α (FIG. 1) between the first and the second keying modules 102, 104. A typical range for the front splay angle α is between 0 to 30 degrees.

The first and the second pivot pins 116, 118 can be anchored using any suitable method. For example, the first and the second pivot pins 116, 118 can be anchored by being fixedly attached to the second base module 110 via an adhesive, a coupling member, being formed from a unitary body of material with the second base module 110, any combination thereof, or any other suitable anchoring method.

Figure 3B:
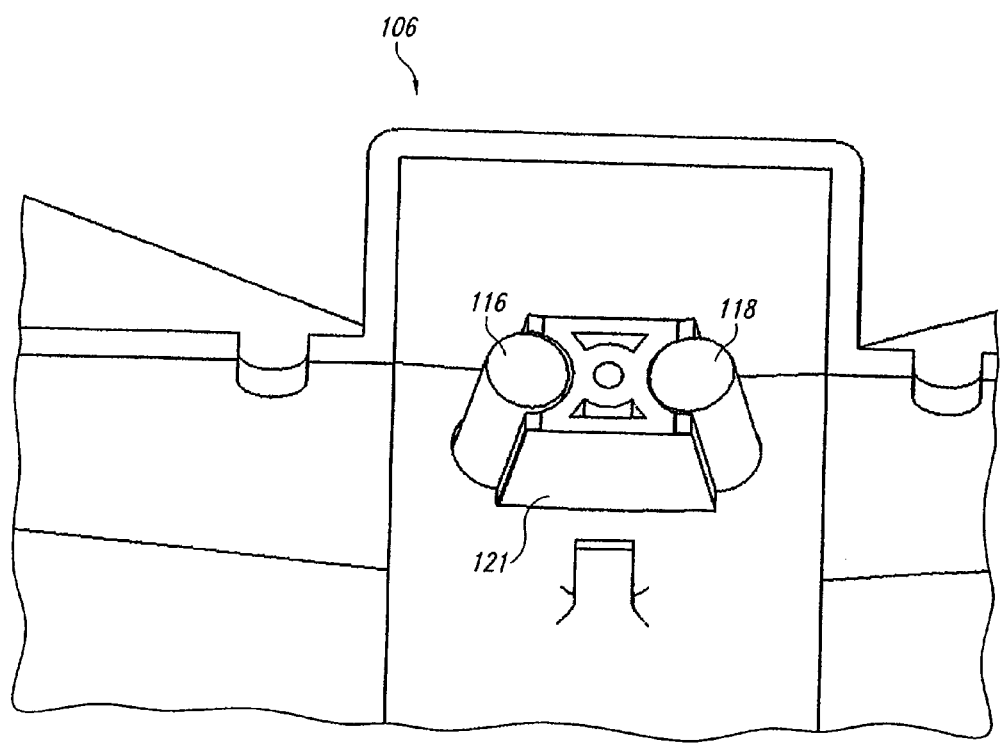
FIGS. 3B and 3C are isometric views of a portion of the adjustable keyboard of FIG. 1.
Figure 3C:
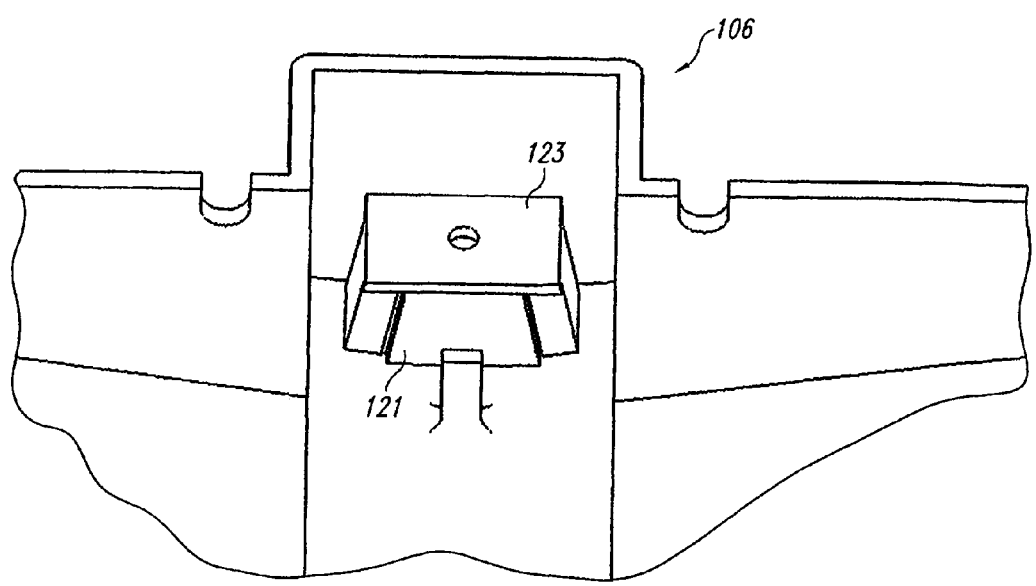

In one embodiment as illustrated in FIGS. 3B and 3C, the first and the second pivot pins 116, 118 can be anchored against a lower surface or underside of the second base module 110. As illustrated in FIG. 3B, the first and the second pivot pins 116, 118 may be positioned and or aligned via an aligning bracket 121, which is fixedly attachable to the underside of the second base module 110. As illustrated in FIG. 3C, an anchoring bracket 123 secures the aligning bracket 121 and the first and the second pivot pins 116, 118 in a desired position against the underside of the second base module 110. The pivot pins 116, 118 may be fabricated from plastic, composites, metals, or any other suitable material. In one embodiment, the pivot pins 116, 118 are fabricated from steel similar or adapted from a clevis or hitch pin (e.g., Hillman #881122, ¼ inch diameter).

Referring to FIG. 2A, the first and the second keying modules 102, 104 may pivot an equal amount with respect to the base assembly 106. For example, if the splay angle α is 30 degrees, typically the 30 degrees is calculated by contributing 15 degrees from the first and the second keying modules 102, 104, respectively, from the position where the first and the second keying modules 102, 104 are positioned such that their lateral ends are substantially parallel (i.e., when a magnitude of the splay angle α is substantially 0 degrees). In this latter position, inner lateral ends 151 (FIG. 2A) of the first and the second keying modules 102, 104 are positioned adjacent one another.

Furthermore, fixed positions correlating with the splay angle α having a magnitude of 0 degrees, 10 degrees, 20 degrees, and 30 degrees are desirable in some embodiments. As illustrated in FIG. 2A, the base assembly 106 may comprise at least two, or a plurality of, angle indicia 122.

Figure 2E:
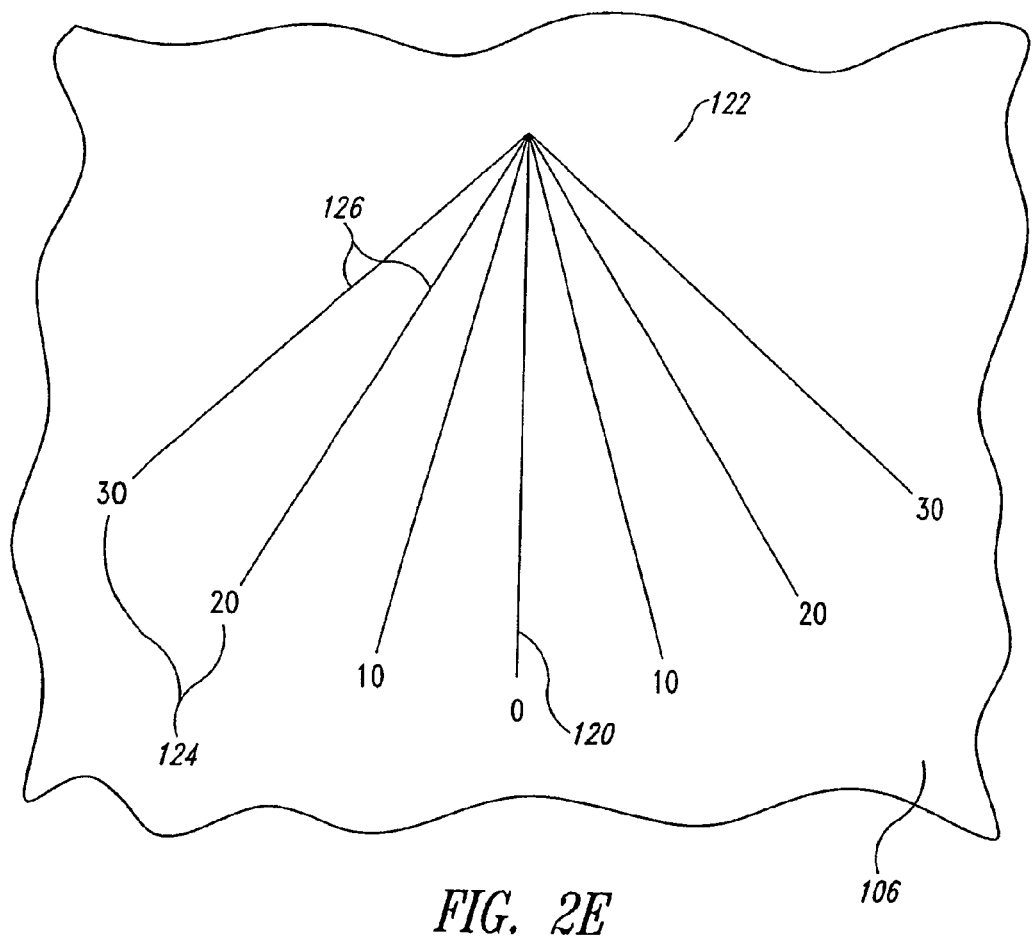

As illustrated in FIG. 2E, the angle indicia 122 may comprise any indicia that can convey an indication of the magnitude of the splay angle α. In the illustrated embodiment of FIG. 2E, the angle indicia comprises a line 126 and a magnitude label 124, such as "10", "20", and "30", appearing on opposing sides of the centerline 120.

Figure 4:
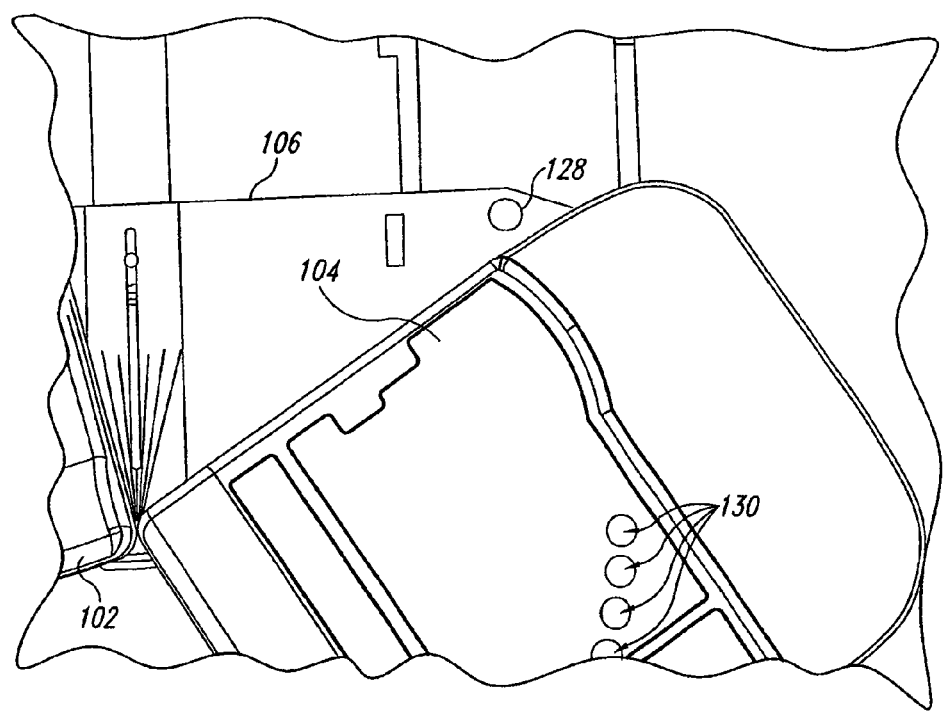
FIGS. 4 and 5 are plan views of a portion of the adjustable keyboard of FIG. 1.
Figure 5:
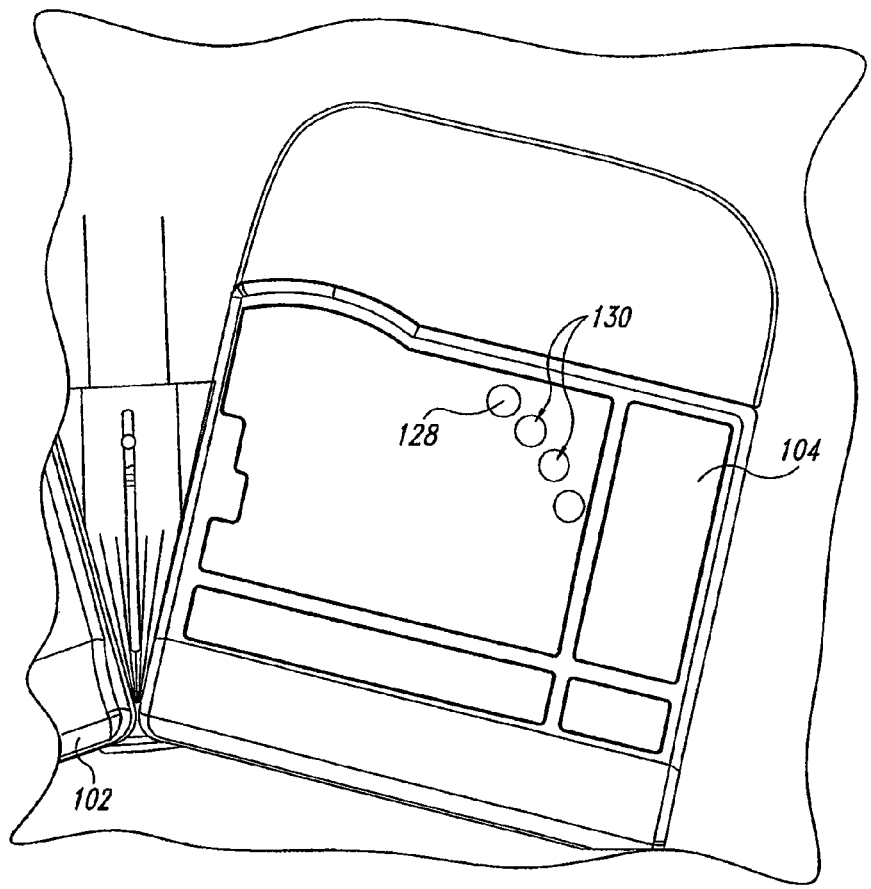

As illustrated in FIGS. 4 and 5, features may be added to a surface of the base assembly 106 and/or the first and the second keying modules 102, 104, such as an upper surface of the base assembly 106 and/or a lower surface or lower portion of the first and/or the second keying modules 102, 104, to prevent the splay angle α from exceeding a desired angle. FIGS. 4 and 5 illustrate the upper surface of the base assembly 106 and the lower portion of the keying modules 102, 104 with the keys removed to expose the lower portion. In one embodiment, the features may include a first structure 128, such as a protrusion projecting from the upper surface of the base assembly 106 and configured to engage one of a series of complementary second structures 130 such as recesses and/or holes formed in the underside or lower portion of the first and/or second keying modules 102, 104. When the protrusion 128 and any one of the recesses 130 coincide and/or engage, the corresponding first or second keying module 102, 104 is fixed at one of the predefined positions, as illustrated in FIG. 5.

One of ordinary skill in the art will appreciate that the first and the second structures 128, 130 can include a combination of complimentary structures configured to fix the first and the second keying modules 102, 104 in a desired position. For example, the first and the second structures 128, 130 may comprise complementary fasteners such as button fasteners, complementary hook and loop fasteners, a curb and a gutter, a locking mechanism, a temporary adhesive, or any other suitable structure or coupling member.

The first and the second structures 128, 130 also enable the user to create reproducible stop points that yield reproducible desired splay angles α. In the illustrated embodiment of FIGS. 4 and 5, the first and second structures 128, 130 respectively include a first protrusion 128 and a first recess 130. In such an embodiment, to move the first or the second keying module 102, 104 from one position to another and change the magnitude of the splay angle α, the user would apply gentle lateral pressure to the corresponding keying module 102, 104 such that the recess 130 slides up and over the protrusion 128 until the next (e.g., the subsequent or preceding) recess 130 becomes coincident therewith. The size of the first and the second structures 128, 130 may vary depending on the quantity thereof. For example, in embodiments in which the splay angle α may be adjusted at five-degree angle intervals instead of ten-degree angle intervals, the first and the second structures 128, 130 may be smaller so that they fit next to each other. Other angle intervals are possible. Additionally, or alternatively, linear slots and round-edged ridges may be incorporated.

In some embodiments, the first and the second keying modules 102, 104 may be loosely pivotably mounted onto the first and the second pivot pins 116, 118, respectively, to prevent potential damage to the first and the second keying modules 102, 104 and/or the first and the second pivot pins 116, 118, for example when removing the first and the second keying modules 102, 104 from the base assembly 106. To further prevent damage, the first and second pivot pins 116, 118 may, respectively, penetrate the first and the second keying modules 102, 104 up to a shallow depth to allow easy release of the first and the second keying modules 102, 104 when the user desires to remove the keying modules 102, 104.

Figure 6:
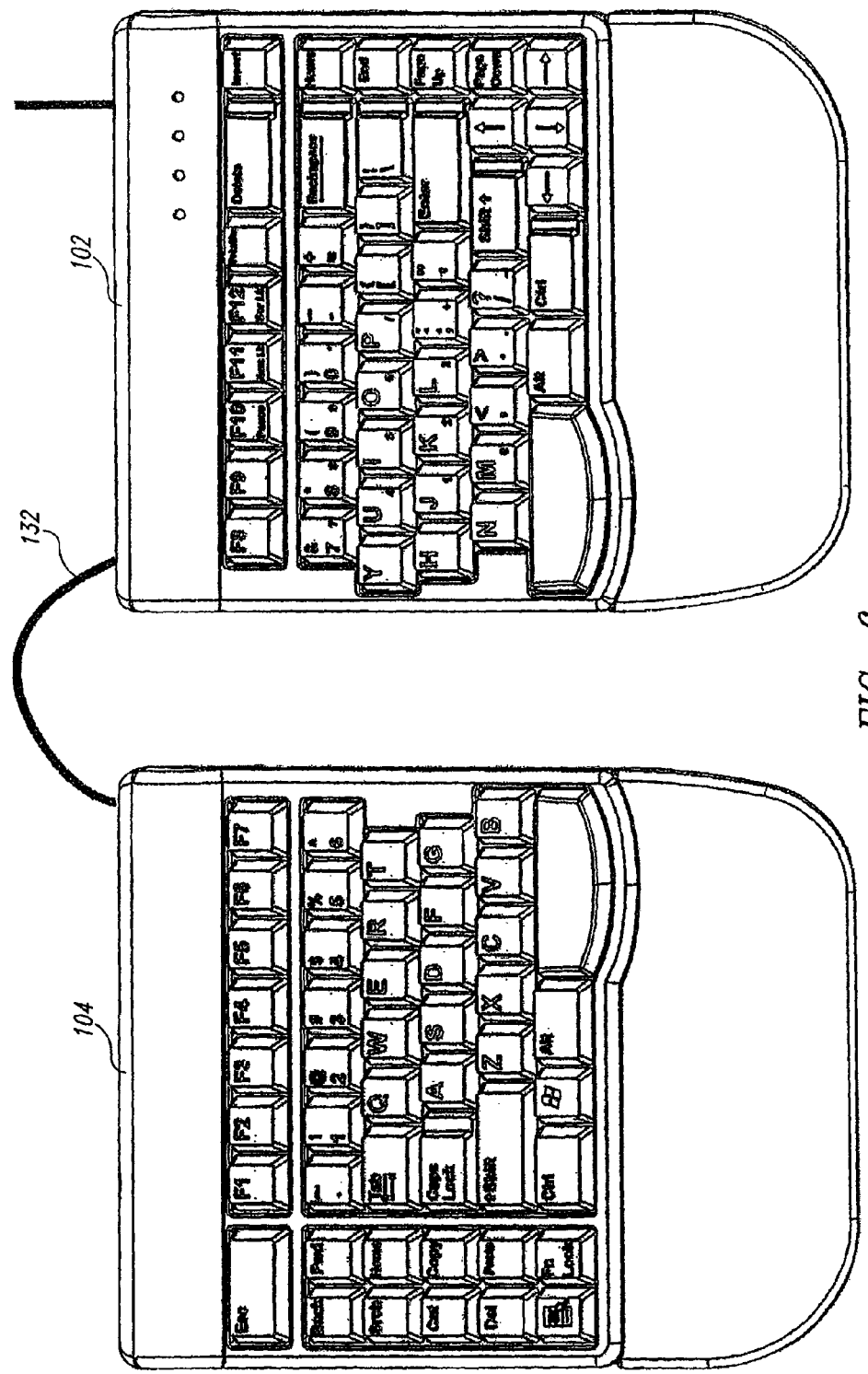
FIG. 6 is a plan view of a portion of the adjustable keyboard of FIG. 1.

FIG. 6 illustrates the first and the second keying modules 102, 104 removed from the base assembly 106 and resting on a flat surface. The first and the second keying modules 102, 104 may be electronically coupled via a linking cable 132. Alternatively, the first and the second keying modules 102, 104 may be in wireless communication. One of ordinary skill in the art will appreciate that the user may also adjust the first and the second keying modules 102, 104 laterally and rotationally as desired, limited by a length of the linking cable 132, in embodiments, which utilize the linking cable 132.

Figure 7:
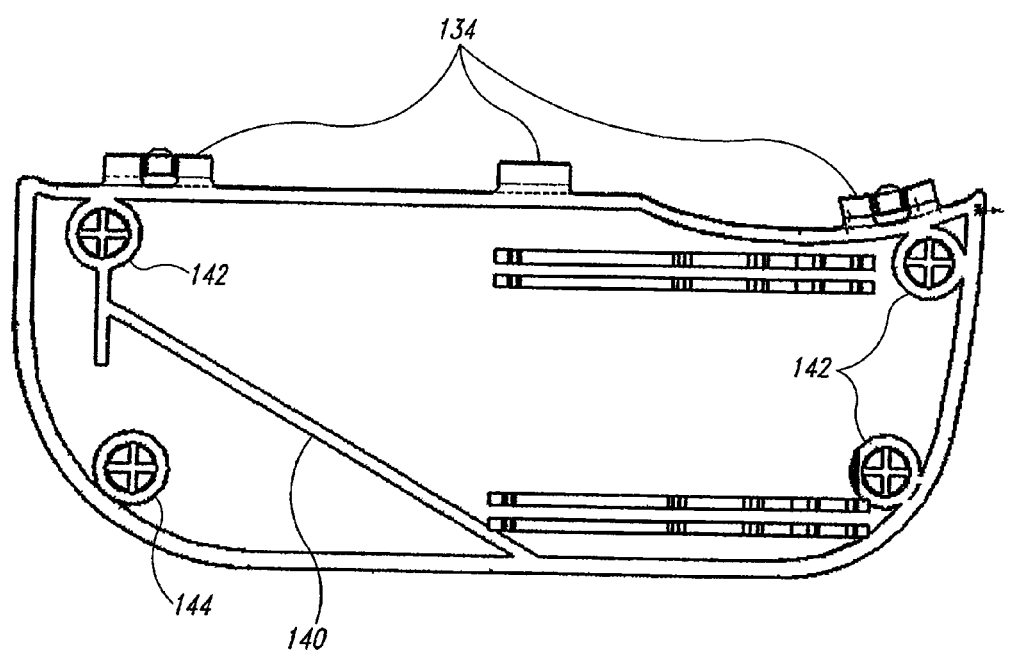
FIG. 7 is a bottom view of a portion of the adjustable keyboard of FIG. 1.

FIG. 7 illustrate one possible configuration for the first and the second palm rests 112, 114. FIG. 7 is a bottom view of the first palm rest 112, and the second palm rest 114 is substantially similar and mirrors the first palm rest 114. The first and the second palm rests 112, 114 comprise at least one first coupling structure 134 configured to engage a complementary second coupling structure 136 (FIG. 1) positioned toward a proximal end of the first and second keying modules 102, 104 with respect to the user, respectively. Alternatively, the first coupling structure 134 may be configured to slide between the first or the second keying module 102, 104 and the base assembly 106. The first coupling structure 134 may engage a portion of the first and/or the second keying modules 102, 104 toward respective proximal ends thereof.

In one embodiment, the palm rests 112, 114 include at least one structure 140, such as a rib, which may be positioned diagonally and may be straight. The rib 140 is configured to contact a portion of the base assembly 106, for example the first base module 108, when the corresponding first or second keying module 102, 104 is rotated to a desired splay angle α (FIG. 2A). The palm rests 112, 114 may also comprise optional bumpers 142 for resting against or engaging the upper surface of the base assembly 106, which in some embodiments may be round and fabricated from a resilient material such as rubber, plastic, or resilient composites. In some embodiments, at least one bumper 144 may not engage or contact the upper surface of the base assembly 106.

Figure 8A:
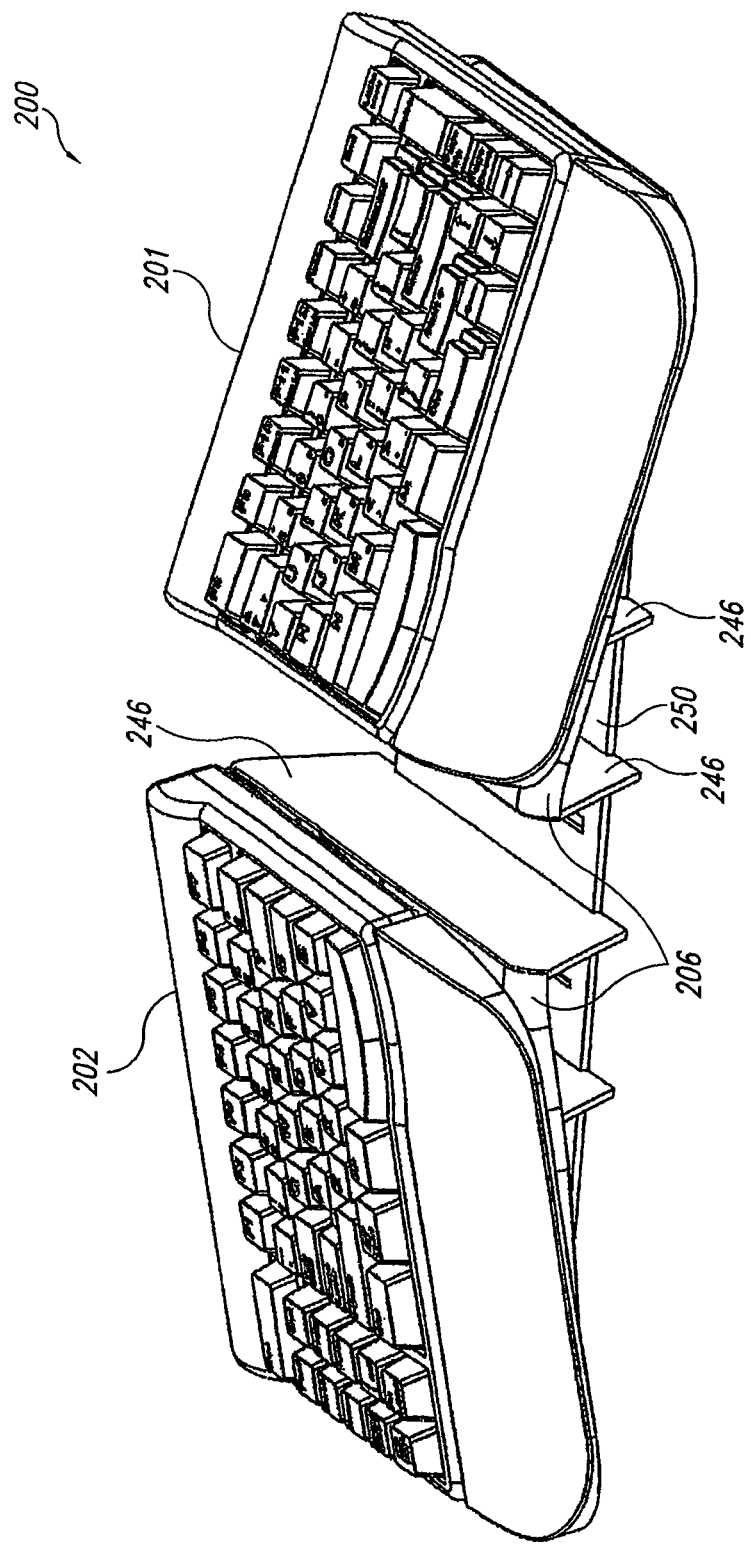
FIG. 8A is an isometric view of an adjustable keyboard according to another embodiment.
Figure 8B:
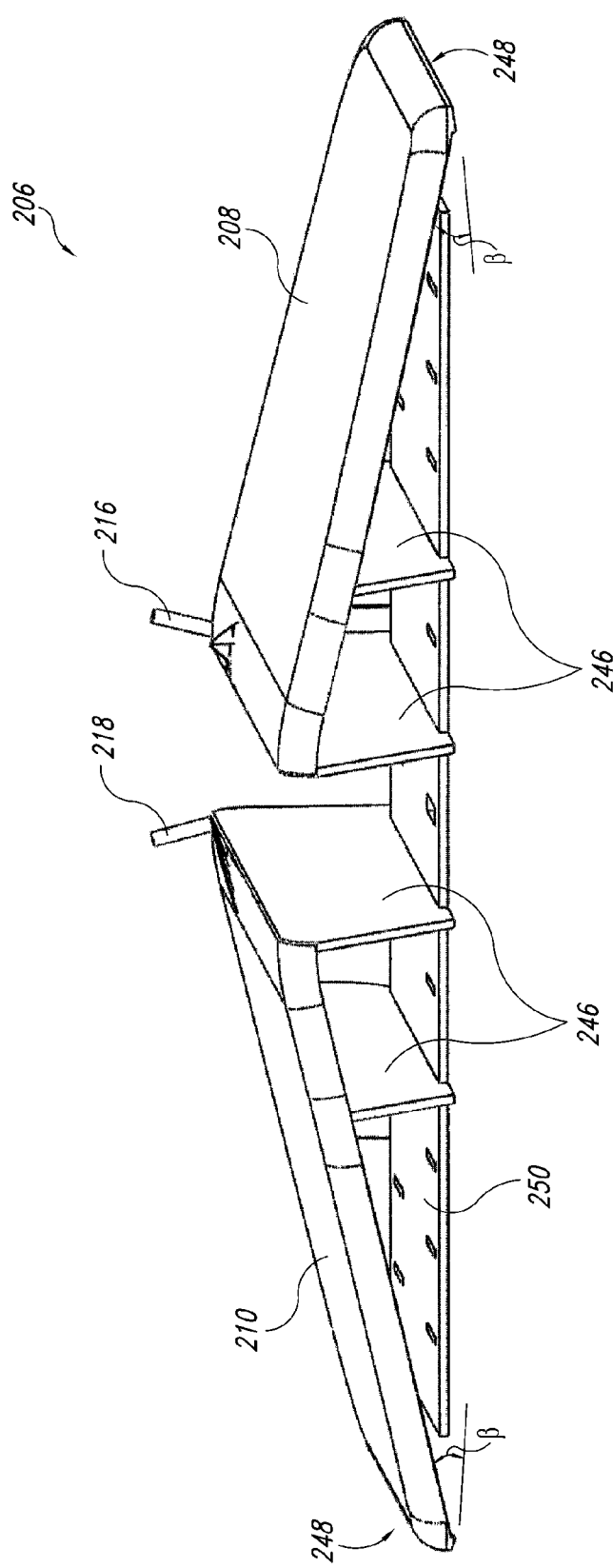
FIG. 8B is an isometric view of a portion of the adjustable keyboard of FIG. 8A.
Figure 8C:
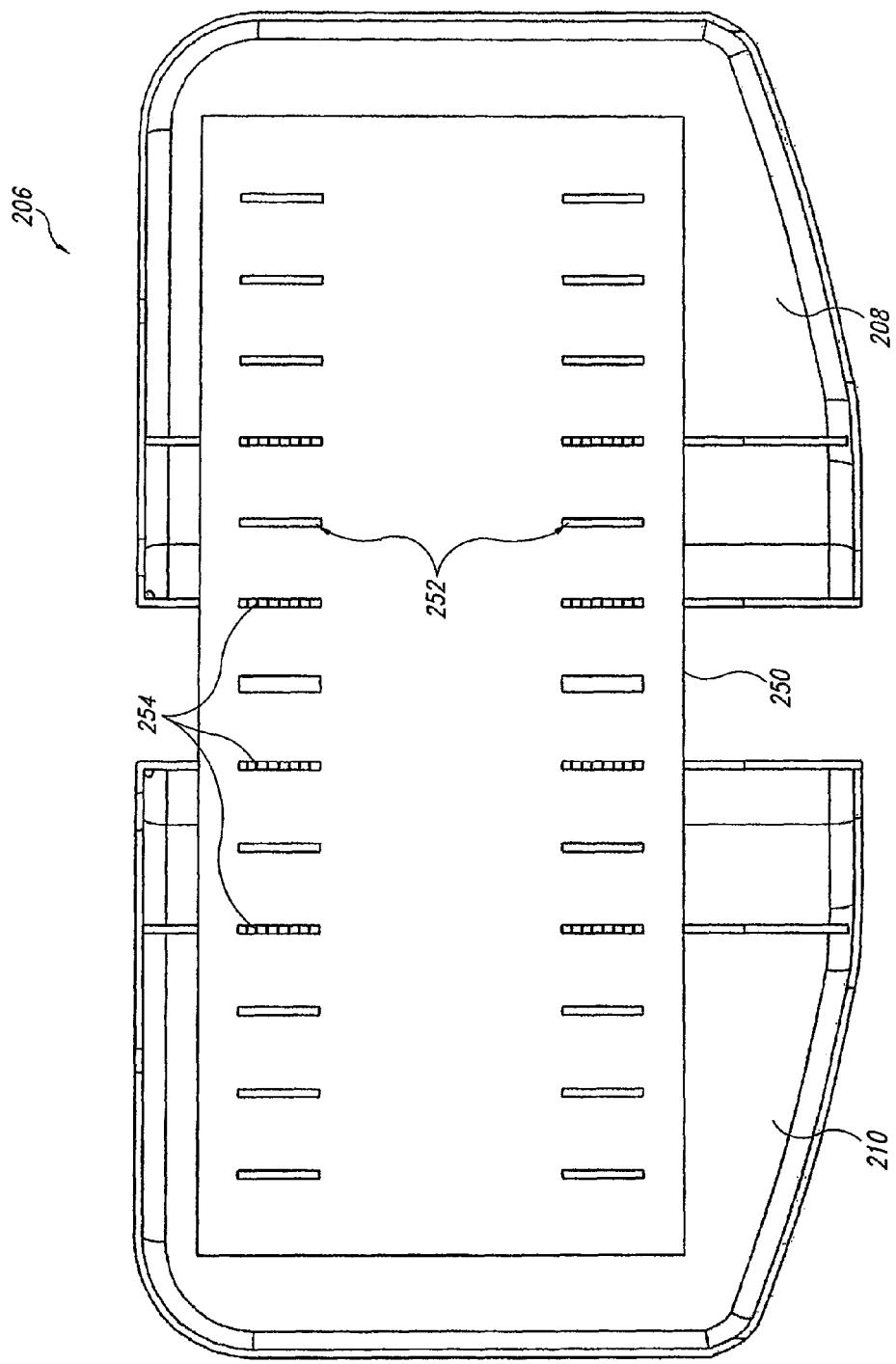
FIG. 8C is a bottom view of a portion of the adjustable keyboard of FIG. 8A.

FIGS. 8A-8C illustrate a portion of an adjustable keyboard 200 according to another embodiment, which comprises a base assembly 206 that is laterally adjustable or separable in addition to supporting a pivoting of first and second keying modules 201, 202. In this manner, the front splay angle α (FIG. 1) can further be adjusted, customized, and/or optimized to prevent strain on the users hands and arms, produce a more comfortable keying position, and increase the user's productivity. The base assembly 206 comprises a first base module 208 having a first pivot pin 216 and a second base module 210 having a second pivot pin 218, the first and the second base modules 208, 210 being configured to separately be supported on a surface. Accordingly, the user may laterally separate or space the first base module 208 from the second base module 210. The first and the second keying modules 201, 202 in this embodiment are pivotably mounted on the separated first and second base modules 208, 210 via the first and the second pivot pins 216, 218 (FIG. 8B) in a manner similar to that described above.

The first and the second base modules 208, 210 each include a tenting angle β with respect to the surface on which they rest. In one embodiment, the tenting angle β is formed by providing at least two ribs 246 that decrease in height toward outer lateral ends 248 of each of the first and the second base modules 208, 210. Each of the ribs 246 includes a first end supporting a surface of the first or the second base modules 208, 210 and a second end that rests on the surface, or on another structure.

The base assembly 206 may further comprise a linking plate 250 comprising laterally arranged slots 252 configured to securely engage at least one coupling member 254 such as a protrusion or a tab formed toward the second end of the ribs 246. In this manner, reproducible separation settings preferred by different users or the same user can be expediently obtained prior to use.

One of ordinary skill in the art will appreciate that the adjustable keyboards 100, 200 according to one of the embodiments discussed thus far provides users with a wide range of adjustability options to provide for a more comfortable and more productive keying position. Furthermore, the base assemblies 106, 206 allow the user to select from a wide range of splay angles α. Additionally, such adjustability can be achieved rapidly with the adjustable keyboards 100, 200. Furthermore, conversion mechanisms discussed above are simple to operate and manufacture. Therefore, the adjustable keyboards 100, 200 can meet needs of a variety of computer users.

FIG. 9A illustrates a portion of an adjustable keyboard 300 according to yet another embodiment. The adjustable keyboard 300 comprises a first keying module 302 and a second keying module 304, both of which are configured to pivotably mount on a base assembly 306. The keying modules 302, 304 are transparently illustrated in FIG. 9A to reveal the base assembly 306. The first keying module 302 may comprise keys generally associated with a right side of a standard computer keyboard, and the second keying module 304 may comprise keys generally associated with a left side of the standard computer keyboard. Other key arrangements are possible as shown in FIG. 9A and as will be described in more detail further below.

FIG. 9B illustrates the base assembly 306 with both keying modules 302, 304 removed. The base assembly 306 includes a raised portion formed toward a lateral central portion 311 which extends from a proximal end to a distal end of the base assembly 306 with respect to the user. The lateral central portion 311 is positioned laterally between opposing lateral ends 348 of the base assembly 306. Thus an upper surface of the base assembly 306 laterally diverges from the lateral central portion 311 toward the opposing lateral ends 348. Accordingly, the base assembly 306 forms opposing tenting angles β, which are fixed and typically include a magnitude which is in a range between 10 degrees and 30 degrees, inclusive, to provide for a more comfortable and productive keying position as discussed above.

As illustrated in FIG. 9A, in one embodiment, the adjustable keyboard 300 may comprise a first latching mechanism 356 and a second latching mechanism 358 for pivotably coupling the first and the second keying modules 302, 304 to the base assembly 306, respectively. The first and the second latching mechanisms 356, 358 are configured to form a first and a second receptacle, which pivotably receive a first pivot pin 316 and a second pivot pin 318, respectively. One of ordinary skill in the art will appreciate that various latching mechanisms may be used to pivotably mount the first and the second keying modules 302, 304 onto the base assembly 306. The following discussion provides details of an example of one such mechanism.

In one embodiment, each of the first and the second latching mechanisms 356, 358 comprise a slide button 360 as illustrated in FIG. 9A. The slide button 360 serves as an interface between the user and the latching mechanisms 356, 358 for actuation thereof when the user desires to mount or dismount the first and the second keying modules 302, 304 onto or from the base assembly 306. The slide button 360 is fixedly attached to a latch 362 (FIG. 10A) for movement therewith, such as lateral movement.

FIG. 10A is a detail view of the latch 362 and FIG. 10B is a detail view of the slide button 360. In one embodiment, lateral motion of the slide button 360 and the latch 362 is facilitated by at least a first structure 364 of the latch, such as a flange, a protrusion, and/or a pin, engaging at least a first structure 366 of the slide button 360, such as a recess, a gutter, a hole, a receptacle, or any other suitable structure allowing engagement of the first structures 364, 366 of the slide button 360 and the latch 362, respectively.

FIGS. 11A and 11B illustrate an underside of the first keying module 302 with a bottom panel 367 (FIG. 12A) thereof removed, an underside of the second keying module 304 being substantially similar and mirroring the underside of the first keying module 302. As shown in FIG. 11A, the slide button 360 is received in a receptacle 368 (FIG. 11B) formed in the respective keying modules 302, 304, coupling toward a first end 370 (FIG. 10B) thereof to the latch 362. Furthermore, the slide button 360 includes a second end 372 (FIG. 10B), toward which the slide button 360 is configured to rest against or be coupled to a biasing member 374 (FIG. 11B), which can be a spring, such as a coil spring, a folded resilient metal, or any other suitable biasing member. Before actuating the latching mechanism 356, the biasing member 374 biases the sliding button 360 and thus the latch 362 toward an opening 380 (FIG. 12A), such that a portion of a concavity 382 (FIG. 10A) formed on the latch 362 laterally extends beyond a periphery of the opening 380.

When the user desires to mount the first and/or the second keying modules 302, 304 onto the base assembly 306 (FIG. 9B), the user inserts the respective pivot pins 316, 318 (FIG. 9B) in the corresponding opening 380 (FIG. 12A) until a tapered portion 379 (FIG. 9B) of the respective pivot pins 316, 318 forces the portion of the concavity 382 away from the opening 380, the concavity 382 clearing the opening 380 and the respective pivot pins 316, 318 extending through the opening 380 of each of the first and the second keying modules 302, 304. Once the pivot pins 316, 318 sufficiently penetrate the openings 380, the biasing member 374 biases the slide button 360 and thus the latch 362 toward the respective pivot pins 316, 318, thereby securing each of the first and the second keying modules 302, 304 against the first and the second pivot pins 316, 318, respectively. When the user desires to dismount the keying modules 302, 304, the user can slide the slide button 360 laterally toward the biasing member 374 so that the portion of the concavity 382 clears the opening 380, allowing the user to pull the keying modules 302, 304 away from the base assembly 306.

The concavity 382 engages a groove 384 (FIG. 9B) formed about a circumference of each of the first and the second pivot pins 316, 318, the groove 384 being spaced from an upper end of the pivot pins 316, 318, for allowing pivoting of each of the first and the second keying modules 302, 304 with respect to the first and the second pivot pins 316, 318, respectively, and thus with respect to the base assembly 306.

Again, although one configuration of a latching mechanism is described above, it will be appreciated by one of ordinary skill in the art that any number of latching mechanisms could be employed. In at least one configuration, the latching mechanism may be designed to yield, without breaking, if the user applies a force up to a pre-determined magnitude. If a keying module 302, 304 is lifted off at an angle relative to the base assembly 306, the respective pivot pin 316, 318 is configured to release from the base assembly 306 without breaking and may be reinserted (once removed from the keying module) by snapping it back into the respective openings 380 in the base assembly 306.

FIG. 12A illustrates the underside of the first keying module 302 with the bottom panel 367 installed. The bottom panel 367 may comprise a multitude of optional features that facilitate positioning and adjustability of the first and the second keying modules 302, 304.

For example, the bottom panel 367 may comprise at least one support member 386, or as shown in the illustrated embodiment of FIG. 12A, four support members 386 that can be fabricated from a material prone to induce friction with a mating surface such as an upper surface of the base assembly 306. Accordingly, when the user adjusts the keying modules 302, 304 to the desired splay angle α, the friction between the support members 386 and the base assembly 306 maintains the keying modules 302, 304 in the desired position. For example, the support members 386 may be fabricated from plastic, natural or synthetic rubbers, composites, any combination thereof, or any other suitable material. Additionally, or alternatively, complementary hook and loop fasteners may be used between the bottom panel 367 and the base assembly 306 to secure the keying modules 302, 304 in a desired position.

Additionally, or alternatively, the bottom panel 367 may comprise at least one, or four as illustrated in FIG. 12A, attachment bosses 388, configured to attach to an optional hinged plate 390 (FIG. 12B) at complementary attachment points 392, for both securing the keying modules 302, 304 in place and also for allowing the user to adjust the tenting angle β of the keying modules 302, 304 via the hinged plate 390. The attachment bosses 388 may be threaded protrusions or receptacles and the attachment points 392 be complementary threaded receptacles or protrusions, respectively. Alternatively, complementary hook and loop fasteners may be used. Other complementary attachment mechanisms are possible. The hinge plate 390 may directly and hingedly couple to the upper surface of the base assembly 306. Alternatively, as shown in FIG. 12B, the hinge plate 390 may be hingedly coupled to a base plate 373, which is fixedly attachable to the upper surface of the base assembly 306 via a coupling structure 371 such as mechanical fasteners, adhesives, hook and loop fasteners, a locking mechanism, or any other suitable coupling structure.

In this embodiment, the first and the second keying modules 302, 304 can be used in a lower profile configuration as compared to a keying module that is directly attached to a base via a hinge such in application Ser. No. 11/342,286, which is incorporated herein by reference, because the hinge plates 390 are removably coupled and the hinge plates 390 can be removed to obtain a low profile for the keying modules 302, 304. Furthermore, attaching the first and the second keying modules 302, 304 to the hinged plate 390 distributes a weight of the keying modules 302, 304, strengthening an attachment between the keying modules 302, 304 and the base assembly 306.

FIG. 12C illustrates the first keying module 302 attached to the hinge plate 390 and pivoted away from the base plate 371. A spacing member 381 is configured to be movable and/or pivotable, with respect to the base assembly 306, between a first and at least a second orientation. In the first orientation, the hinge plate 390 and the first keying module 302 are positioned adjacent a first portion of the upper surface of the base assembly 306 between the raised portion and a first lateral end 365 of the base assembly 306, as illustrated in FIG. 9A. In the second orientation, the hinge plate 390 and the first keying module 302 are spaced at an angle away from the base assembly 306, as illustrated in FIG. 12C. The hinge plate 390 or the bottom panel 367 of the keying modules 302, 304, can include at least one engagement structure 369 configured to releasably retain the spacing member 381 at a corresponding angular orientation for retaining the first keying module 302 at a corresponding desired angle with respect to the upper surface of the base assembly 306 for further adjusting the tenting angle. Additional engagement structures can be added to provide for retaining the first keying module 302 at various angular orientations. The engagement structure 369 may include a recess, a gutter, a locking mechanism, a latch, hook and loop fasteners, button fasteners, mechanical fasteners, any combination thereof, or any other suitable engagement structure. The second keying module 302 may be similarly adjusted.

Referring back to FIG. 12A, the bottom panel 367 may comprise a threaded receptacle 394, which is configured to receive a complementary threaded protrusion 396 (FIG. 9B) of the base assembly 306, such as a screw, which slidably anchors the respective keying modules 302, 304 to the base assembly 306. The base assembly 306 comprises an arcuate slot 398 (FIG. 9B) along which the threaded protrusion 396 travels. This attachment can supplement the attachment to the pivot pins 316, 318 and allow the user to conveniently lift the entire keyboard/fixed base assembly from any side. Additionally, tightening the threaded protrusion 396 secures the keying modules 302, 304 in the desired position.

Furthermore, the adjustable keyboard 300 may comprise a first and a second palm rest. The first palm rest 312 is shown and the second palm rest is substantially similar to and mirrors the first palm rest 312. The first palm rest 312 can be configured to engage the first keying module 302 to allow the user to lift the adjustable keyboard 300 by lifting at least one of the palm rests, for example, the first palm rest 312. In one embodiment, the first palm rest 312 includes at least one blade 327, or as shown, three blades 327, which are configured to securely engage respective receptacles 329 formed toward proximal ends of the first and the second keying modules 302, 304, respectively. Optional beveled protrusions 331 may also be added on the first keying module 302 configured to engage respective latches 332 formed toward a portion of the first palm rest 312 that couples to the first keying module 302. The beveled protrusions 331 are configured to engage the latches 332, for further securing the first palm rest 312 to the first keying module 302. The first palm rest 312 may be easily removed by pulling the first palm rest 312 toward the user without requiring any special motion or training.

As illustrated in FIG. 9B, in some embodiments, the base assembly 306 may further include elevated features 391 (FIG. 9B), positioned for providing support for the first and the second keying modules 302, 304 and/or the palm rests, for example the first palm rest 312. The elevated features 391 can be fabricated from plastic, rubber, composites, metal, wood, or any other material suitable support the first and the second keying modules 302, 304.

One of ordinary skill in the art will appreciate that in different embodiments, the pivot pins 316, 318 can be fixedly secured and/or attached to the base assembly 306 via a number of methods. Examples include forming the pivot pins 316, 318 from a unitary body of material with the base assembly 306. Alternatively, the pivot pins 316, 318 may be adhered using various adhesives in a receptacle formed in the upper surface of the base assembly 306.

FIG. 13A illustrates a detailed view of the first pivot pin 316 according to one embodiment, the second pivot pin 318 being substantially identical and mirroring the first pivot pin 316. The pivot pins 316, 318 include an engagement portion 333 for fixedly coupling to the base assembly 306 (FIG. 13B).

In the illustrated embodiment of FIG. 13B, the engagement portion 333 is configured to engage an opening 301 formed in the base assembly 306. As more clearly apparent in FIG. 13C, the engagement portion 333 comprises resilient flanges that are configured to contract and slide through the opening 301 and expand after extending therethrough, thereby engaging the opening 301 and securely coupling to the base assembly 306. The engagement portion 333 thus forms a spring-loaded button and latch assembly allowing the pivot pins 316, 318 to snap into the openings 301 of the base assembly 306. This configuration simplifies assembly and reduces manufacturing expenses, especially when the pins are fabricated from non-metals such as composites and plastic. In one embodiment the pivot pins 316, 318 may be fabricated from a material that is sufficiently strong, yet flexible, or otherwise be configured to be released from the latching mechanisms 356, 358 and/or the base assembly 306 upon experiencing a force greater in magnitude than a threshold force. For example, the pivot pins 316, 318 can be fabricated from a thermopolymer such as Polyoxymethylene (POM) or DELRIN® to mold the pivot pins 316, 318, or any other material that is strong yet flexible.

FIG. 14 illustrates still another embodiment, in which an adjustable keyboard 400 comprises a first keying module 402 pivotably coupled to a second keying module 404 via a pivot link assembly 415 (FIG. 15). As illustrated in FIG. 15, the pivot link assembly 415 includes a first pin 416 and a second pin 418, respectively mounted on a first base 435 and a second base 437, each being pivotably coupled to a fastener 417. The fastener 417 can comprise a rivet, nut and screw, flanged pin, bearing, any combination thereof, or any other suitable fastener that secures the first and second bases 435, 437. Each of the pins 416, 418 comprises a groove 439 formed in an outer surface 441 thereof, the groove 439 extending about at least a portion of a circumference of the respective pins 416, 418.

Furthermore, as illustrated in FIG. 14, each of the first and the second keying modules 402, 404 comprise a latching mechanism 460 substantially similar to the latching mechanism 360 discussed above. The two latching mechanisms 460 are configured to fixedly engage the first and the second pins 416, 418 in a manner similar to that described above. Except, in this embodiment the latching mechanisms 460 fixedly couple to the first and the second pins 416, 418 and the pins 416, 418 pivot with respect to each other, thereby facilitating pivoting the first and the second keying modules 402, 404 until an splay angle α formed between the first and the second keying modules 402, 404 widens to a desired magnitude. The splay angle α diverges toward the user to position the first and the second keying modules 402, 404 in an orientation that allows the user's hands to naturally extend from the user's arm, instead of having to rotate at the wrist, the latter being the case with conventional keyboards.

In some embodiments, the latching mechanism 460 can tightly engage the first and the second pivot pins 416, 418, such that in a case where the user lifts the adjustable keyboard 400 by lifting only one of the keying modules 402, 404, the pivot link assembly 415 remains coupled to the other of the keying modules 404, 402, for preventing the latter from being released and damaged. In such an embodiment, the pivot link assembly 415 can be fabricated from a material sufficiently strong to support a weight of at least one of the keying module 402, 404, for example the one that is not supported by the user when lifting. For example, the pivot link assembly 415 may be fabricated from a thermopolymer such as POM or DELRIN®.

The pivot link assembly 415 allows the first and the second keying modules 402, 404 to splay, yet not completely separate for creating an ergonomic keying position. Furthermore, in embodiments where the pivot link assembly 415 is fabricated from a flexible material, the pivot link assembly 415 further supports the keying modules 402, 404 being positioned with a tenting angle. Typically the amount of splay will be unlimited; however, the first and the second bases 435, 437, and/or flanges 449 thereof, can include a structure, which acts as a stop or an obstacle to limit splay to a desired or predetermined maximum magnitude, such as one that limits splay to magnitudes up to and equal to the splay angle α of 30 degrees. It is understood that if the user desires to completely separate the first and the second keying modules 402, 404, the user may slide the latching mechanism 460 on at least one of the keying modules 402, 404 for releasing one or both sides of the pivot link assembly 415.

In one embodiment, the first and the second bases 435, 437 are short flanges extending toward a distal end of the adjustable keyboard 400, with respect to the user, and the coupling flanges 449 are short flanges extending medially for pivotably coupling to a central pivotable link such as pivotably coupling to the fastener 417. Furthermore, the first and the second bases 435, 437 may comprise a curved portion formed such that when the first and the second keying modules 402, 404 are coupled to the pivot link assembly 415, a portion of the distal ends of the keying modules 402, 404 nests in the curved portions of the first and the second bases 435, 437.

As illustrated in FIG. 16, in one aspect, the adjustable keyboard 400 may comprise first and second lift modules 443, 445, which are configured to couple toward inner lateral ends 451 of the first or second keying modules 402, 404, respectively. As illustrated in FIG. 17A, each of the first and the second lift modules 443, 445 comprises at least one coupling structure 447 formed toward a first end thereof, on a support plane 463, configured to fixedly couple to the first and the second keying modules 402, 404 (FIG. 16), and/or to the palm rests, for maintaining the inner lateral ends 451 of the first and the second keying modules 402, 404 spaced from a resting surface and forming a tenting angle β, as illustrated in FIG. 16. In the illustrated embodiment of FIG. 17A, one of the lift modules 443, 445 is shown having two coupling structures 447, one for coupling to the corresponding keying module 402, 404 and one for coupling to the corresponding palm rest.

The first and the second lift modules 443, 445, each comprise at least one support limb 453 having feet 455 toward a second end thereof, opposing the first end. The feet 455 rest on the resting surface as the support limbs 453 maintain the inner lateral ends 451 (FIG. 16) of the first and the second keying modules 402, 404 spaced from the resting surface. Opposing outer lateral ends 457 of the first and the second keying modules 402, 404, opposing the inner lateral ends 451, are positioned on the resting surface, thereby forming the tenting angle β, as shown in FIG. 16.

In the illustrated embodiment of FIGS. 16 and 17A-17C, the first and the second lift modules 443, 445 include a first limb 453 and a second limb 465, the first and the second limbs 453, 465 being rigidly attached and converging toward an apex to form a V-shaped configuration. Each of the first and the second limbs 453, 465 comprise feet 455. The first and second lift modules 443, 445 are pivotably coupled to the support plane 463, for example via a pin 461 formed toward the apex and a slot or latch 459 formed on the support plane 463. In such an embodiment, the lift modules 443, 445 are operable to space the inner lateral ends 451 of the first and the second keying modules 402, 404 and vary a magnitude of the tenting angle β between two distinct angles. The user can pivot the limbs 453, 465 with respect to the support plane 463 to switch between the two distinct magnitudes for the tenting angle β. For example, as shown in FIG. 16, the user may pivot the limbs 453, 465 such that the support plane 463 rests against the second limb 465 and the first limb 453 rests on the resting surface to achieve a first magnitude for the tenting angle β, such as 15 degrees. Alternatively, as shown in FIG. 17C, the user may pivot the limbs 453, 465 such that the support plane 463 rests against the first limb 453 or a boss 467 (FIG. 17B) formed on a surface of the first limb 453, and the second limb 465 rests on the resting surface to achieve a second magnitude for the tenting angle β, such as 10 degrees. The adjustable magnitudes for the angle β can be controlled by varying a configuration or dimension of components of the first and the second lift modules 443, 445 during manufacturing. These dimensions can include an angle formed between the first and the second limbs 453, 465, a length of the first and the second limbs 453, 465, and/or a height of the boss 467.

One of ordinary skill in the art will appreciate that features may be added to the first and the second lift modules 443, 445 to allow the user to further adjust these dimensions. However, a configuration where these dimensions are fixed to allow the user to easily and expediently switch between two commonly used magnitudes for the tenting angle β, simplifies manufacturing and use of the adjustable keyboard 400, thereby improving acceptability and adaptability of manufacturers and/or users toward the adjustable keyboard 400. Since the limbs 453, 465 are pivotably coupled to the support plane 463, the user does not need to separate the lift modules 443, 445 from the keying modules 402, 404 when switching between the two magnitudes of the tenting angle β. Since such an embodiment includes only two tenting positions, it provides a level of simplicity, which is appealing and adequate for most computer users. Furthermore, in embodiments where the coupling structures 447 do not require tools for removing the first and the second lift modules 443, 445, the user may easily and expediently remove the lift modules 443, 445 for placing the keying modules 402, 404 on the surface without tenting.

In one embodiment, the first and the second lift modules 443, 445 are configured for maintaining the tenting angle β at a magnitude in the range of approximately 10 degrees to 20 degrees, an in one aspect, between a range of approximately 10 degrees to 15 degrees. The user may operate the first and the second keying modules 402, 404 with the pivot link assembly 415 (FIG. 15) and/or the first and the second lift modules 443, 445, for positioning the adjustable keyboard 400 at a desired splay angle α and a desired tenting angle β. Alternatively, the user may choose to use only use the first and the second lift modules 443, 445, removing the pivot link assembly 415, for separating the first and the second keying modules 402, 404 laterally or in any desired direction. Furthermore, the first and the second lift modules 443, 445 obviate a need for a base assembly having a tenting angle; however, some users may prefer a combination of the first and the second lift modules 443, 445 and a base, for example lift modules configured to pivotably mount on a base, such as a separately tented base.

The first and the second lift modules 443, 445 also eliminate a need for using a plate or an end hinge mechanism on the separate base assembly or on an end of the keying modules, as described above in conjunction with some of the embodiments. Eliminating the hinge mechanisms further simplifies manufacturing and use of the adjustable keyboard 400.

In embodiments where both the pivot link assembly 415 and the lift modules 443, 445 are used, the flanges 449 of the pivot link assembly 415 may be fabricated from a flexible and/or resilient material, such as natural or synthetic rubbers, polypropylene, plastics, flexible composites, flexible or thin metals such as thin spring steel, silicone, any combination thereof, or any other material that can flex and have sufficient strength to not fail to accommodate the tenting angle β of the first and the second keying modules 402, 404. The flanges 449 may be attached to the pivot pins 416, 418, or modules respectively supporting them, by being bonded, mechanically fastened, molded from a unitary body of material with the pivot link assembly 415, or coupled via a locking mechanism having complementary engagement portions, any combination thereof, or any other suitable method fixedly attaching the flanges 449 to the pivot pins 416, 418.

Additionally, or alternatively, the fastener 417 (FIG. 15) may be loosely coupled to the flanges 449 to accommodate various tenting angles, such those discussed herein. Furthermore, the first and the second bases 435, 437 can comprise a low profile to prevent undesirably raising an end of the keying modules 402, 404, such as a distal end with respect to the user.

In addition, components of the first and the second lift modules 443, 445, such as the limb 453, the support plane 463, and the coupling structure 447, can be universal. When these components are assembled during manufacturing, the first and the second lift modules 443, 445 can be selectively configured, for example the first module 443 can be configured to act as a right-handed module and the second lift module 445 can be configured to act as a left handed module.

In any of the embodiments discussed herein, the first keying modules 102, 202, 302, 402 may be operatively coupled to the second keying modules 104, 204, 304, 404, respectively, via a linking cable and/or via a wireless connection. Furthermore, any of the embodiments discussed herein may or may not include the removable palm rests; however, it is understood that palm rests having any or a combination of features described above in conjunction with some of the illustrated embodiments, can be used with any of the first keying modules 102, 202, 302, 402 and the second keying modules 104, 204, 304, 404.

One of ordinary skill in the art will appreciate that any of the keying modules 102, 104, 202, 204, 302, 304, 402, 404 discussed above may comprise a standard keying layout according to any existing traditional or alternative keying layouts. However, in some embodiments, the first and the second keying modules 102, 104, 202, 204, 302, 304, 402, 404 may comprise a keying layout that further promotes the user's productivity. Furthermore, one of ordinary skill in the art will appreciate that any of the keying modules 102, 104, 202, 204, 302, 304, 402, 404 may comprise any suitable connection type for connecting for example to a computer, such as a USB or a PS2 connection.

For example, according to one embodiment, any of the first and the second keying modules 102, 104, 202, 204, 302, 304, 402, 404 discussed herein may comprise a key layout 500, illustrated in FIG. 18, which is configured to minimize adaptation efforts, and maximize acceptance, versatility, and productivity. The layout 500 is configured to minimize a lateral dimension 505 of each of the keying modules 102, 104, 202, 204, 302, 304, 402, 404 such that the user can easily and expediently reach all the keys 503 and a mouse or other peripheral tools (not shown), which the user may employ without reducing the standard key-to-key spacing. Furthermore, although some editing and modifier keys 507, such as "CAPS LOCK", "SHIFT", and "ENTER" keys, are reduced in size, they are not significantly reduced and remain sufficiently sized to accommodate efficient keying.

These keys are typically grossly oversized in conventional layouts. Since, most present day typists are more sophisticated as compared to typists of a time when these layouts were designed, such extreme oversizing of these keys results in a large layout without providing significant benefits. Accordingly, the key layout 500 of FIG. 18 provides editing and modifier keys 507 that are reduced in size such that most or all user's can continue to efficiently, accurately, and expediently actuate these keys while reducing space requirements to reduce the lateral dimension 505 of the keying modules 102, 104, 202, 204, 302, 304, 402, 404.

One of ordinary skill in the art will appreciate that special key actions, such as whether a SPACE key performs space or backspace action, can be selected by means of firmware (e.g., holding the FUNCTION (Fn) key and SPACE key for several seconds to toggle a predetermined action). Additionally, or alternatively, such assignment of actions to keys 503 can be accommodated by means of a slide switch, for example, one which the user can access from a rear or underside of the keying modules 102, 104, 202, 204, 302, 304, 402, 404.

In one aspect, the key layout 500 may further comprise special action keys 509. The special action keys 509 may be configured to trigger frequently used actions, which the user typically requires multiple mouse clicks or other actions to trigger. For example, the special actions may include navigation and editing actions, such "BACK" and "FORWARD" for example for web and windows browsing, and/or "CUT" and "PASTE" for any application. One of ordinary skill in the art will appreciate that such actions can be assigned to the special action keys 509 without a need for special drivers by placing combined standard key codes in a matrix of a microprocessor of the keying modules 102, 104, 202, 204, 302, 304, 402, 404. Furthermore, other special action keys 509 can be added as desired.

In the following example, the first and the second keying modules refer to any one or all of the first and the second keying modules 102, 104, 202, 204, 302, 304, 402, 404 discussed herein. In one embodiment, the key layout 500 comprises a plurality of non-alphanumeric modifier and editor keys including a CTRL key, at least one SHIFT key, a CAPS LOCK key, a TAB key, an ENTER key, and a BACKSPACE key. The non-alphanumeric modifier and editor keys include a reduced size to minimize a lateral dimension 505 of the first and the second keying modules. For example, the reduced size may include a lateral dimension ranging between 0.25 and 1.5 inches. Furthermore, the first keying module includes a laterally elongated DELETE key 511, for example having a dimension between 0.75 and 2 inches, and positioned adjacent and toward the distal end of the first keying module with respect to the BACKSPACE key. The first keying module further includes a plurality of editor keys including a HOME key, an END key, a PAGE UP key, and a PAGE DOWN key, which are arranged in a series between the proximal and distal ends of the first keying module, the series being positioned toward the outer lateral end of the first keying module with respect to the BACKSPACE key.

Furthermore, commonly used modifiers and alphanumeric keys comprising the BACKSPACE key 513, a BACK SLASH key 515, the ENTER key 517, the CAPS LOCK key, the DELETE key and the SHIFT key 519, each have a ledge 521 formed toward an end thereof adjacent or proximate adjacent keys such as the series of the plurality of editor keys, the ledge 521 being configured to space the commonly used modifier and alphanumeric keys from the series to prevent inadvertent keying of the series of the plurality of editor keys. Furthermore, the second keying module comprises an elongated ESC key, for example having a lateral dimension in a range between 0.75 inch and 2 inches, and a plurality of navigation keys comprising a BACK key, a FWD key, a SEARCH key, a HOME key, a CUT key, a COPY key, and a PASTE key arranged in a series toward the proximal end of the second keying module with respect to the ESC key.

The key layout 500 of FIG. 18 includes one example of a key arrangement. One of ordinary skill in the art will appreciate that various key arrangements that also include similar resizing of the keys and including navigation keys as those discussed above in conjunction with FIG. 18, are within the scope and spirit of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An adjustable keyboard comprising:
a base assembly having a bottom portion configured to rest on a supporting surface, the base assembly having an upper surface with a raised central portion relative to opposing first and second lateral ends of the base assembly, to form opposing tenting angles with respect to the supporting surface during use;
a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end;
a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end;
a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules; and
a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules,
wherein the upper surface of the base assembly comprises a first and a second opening respectively positioned on opposing lateral sides of the raised central portion, and the first and the second coupling members include a first pivot pin and a second pivot pin, each extending through the first and the second openings, respectively, for fixedly attaching to an underside of the base assembly, and
wherein the first and the second pivot pins fixedly attach to the underside of the base assembly with an anchoring structure including an aligning bracket interposed between the first and the second pivot pins for maintaining a constant distance therebetween and an anchoring bracket fixedly attaching the aligning bracket and the first and the second pivot pins to the underside.

2. The adjustable keyboard of claim 1, further comprising:
a first arcuate slot formed in the first portion of the upper surface of the base assembly;
a third coupling member slidably coupling the first keying module to the base assembly, the third coupling member being configured to slide along the first arcuate slot when the first keying module is pivoted with respect to the base assembly;
a second arcuate slot formed in the second portion of the upper surface of the base assembly; and
a fourth coupling member slidably coupling the second keying module to the base assembly, the fourth coupling member being configured to slide along the second arcuate slot when the second keying module is pivoted with respect to the base assembly.

3. The adjustable keyboard of claim 1, further comprising:
a first palm rest configured to be removably coupled to the proximal end of the first keying module; and
a second palm rest configured to be removably coupled to the proximal end of the second keying module.

4. The adjustable keyboard of claim 3 wherein the first and the second palm rests couple to the first and the second keying modules, respectively, via a coupling structure comprising at least one blade formed on each of the first and the second palm rests, the at least one blade being configured to removably engage at least one receptacle formed toward the proximal end of the first and the second keying modules, respectively.

5. An adjustable keyboard comprising:
a base assembly having a bottom portion configured to rest on a supporting surface, the base assembly having an upper surface with a raised central portion relative to opposing first and second lateral ends of the base assembly, to form opposing tenting angles with respect to the supporting surface during use, and the base assembly comprising a first base module and a second base module configured to move laterally with respect to each other;
a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end;
a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end;
a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules; and a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules.

6. The adjustable keyboard of claim 5 wherein each of the first and the second base modules comprises at least one rib positioned between the inner and the outer lateral ends configured to space the inner lateral ends from the supporting surface.

7. The adjustable keyboard of claim 6, further comprising:
a linking plate positionable on the supporting surface and comprising a plurality of openings, the openings being laterally arranged and configured to receive at least one protrusion formed toward an end of the ribs of the first and the second base modules, opposing an end of the at least one rib, which is coupled to the first and the second base modules, for maintaining the first and the second base modules at a desired separation.

8. An adjustable keyboard comprising:
a base assembly having a bottom portion configured to rest on a supporting surface, the base assembly having an upper surface with a raised central portion relative to opposing first and second lateral ends of the base assembly, to form opposing tenting angles with respect to the supporting surface during use;

a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end;

a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end;

a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules; and a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules, and wherein the upper surface of the base assembly comprises a first and a second opening respectively positioned on opposing lateral sides of the raised central portion, and the first and the second coupling members include a first pivot pin and a second pivot pin, each having a resilient portion configured to fixedly and removably engage the first and the second openings, respectively, for fixedly attaching to the base assembly.

9. The adjustable keyboard of claim 8, further comprising:
a first latching system formed on the first keying module including a first slide button fixedly coupled to a first latch for motion therewith between a first position and a second position, the first latch being configured to pivotably engage the first pivot pin about a circumference thereof when in the first position; and a second latching system formed on the second keying module including a second slide button fixedly coupled to a second latch for motion therewith between a first position and a second position, the second latch being configured to pivotably engage the second pivot pin when in the first position.

10. The adjustable keyboard of claim 9 wherein the first slide button is fixedly coupled to the first latch for lateral motion therewith and the second slide button is fixedly coupled to the second latch for lateral motion therewith.

11. The adjustable keyboard of claim 10, further comprising:
a first biasing member and a second biasing member, wherein
a portion of the first latch obstructs a portion of the first opening when the first latch is in the first position, and the first slide button is configured to shift toward the second position and against the first biasing member when the first pivot pin is inserted in the first opening, the first pivot pin shifting the latch away from the first opening for receiving the first pivot pin therethrough;
the first biasing member is configured to bias the first slide button and the first latch toward the first position, the first latch being biased against and pivotably engaging the first pivot pin, the first latch being configured to release the first pivot pin when first latch is shifted toward the second position;
a portion of the second latch obstructs a portion of the second opening when the second latch is in the first position, and the second slide button is configured to shift toward the second position and against the second biasing member when the second pivot pin is inserted in the second opening, the second pivot pin shifting the first latch away from the second opening for receiving the second pivot pin therethrough; and
the second biasing member is configured to bias the second slide button and the second latch toward the second position, the second latch being biased against and pivotably engaging the second pivot pin, the second latch being configured to release the second pivot pin when second latch is shifted toward the second position.

12. The adjustable keyboard of claim 11 wherein the first slide button is configured to shift laterally toward the second position, the first biasing member is configured to laterally bias the first slide button and the first latch toward the second position, the second slide button is configured to shift laterally toward the second position, and the second biasing member is configured to laterally bias the second slide button and the second latch toward the second position.

13. The adjustable keyboard of claim 12 wherein each of the first and the second pivot pins include a groove formed about a circumference thereof, and each of the first and the second latches comprise a concave portion, the concave portions configured to rotatably engage the grooves for pivotably coupling the first and the second keying modules to the base assembly, respectively.

14. An adjustable keyboard comprising:
a base assembly having a bottom portion configured to rest on a supporting surface, the base assembly having an upper surface with a raised central portion relative to opposing first and second lateral ends of the base assembly, to form opposing tenting angles with respect to the supporting surface during use;
a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end;
a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end;
a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules;
a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules;
a first hinge plate hingedly coupled to the base assembly and configured to couple to the first keying module;
a first spacing member configured to be movable between a first orientation in which the first hinge plate and the first keying module are positionable adjacent the first portion of the base assembly, and at least a second orientation in which the first hinge plate and the first keying module are spaced at an angle apart from the base assembly, the first hinge plate having at least one engagement structure configured to releasably retain the spacing member at a corresponding angular orientation for retaining the first keying module at a corresponding angle with respect to the base assembly to increase the tenting angle of the first keying module;
a second hinge plate hingedly coupled to the base assembly and configured to couple to the second keying module; and
a second spacing member configured to be movable between a first orientation in which the second hinge plate and the second keying module are positionable adjacent the second portion of the base assembly and at least a second orientation in which the second hinge plate and the second keying module are spaced at an angle apart from the base assembly, the second hinge plate having at least one engagement structure configured to releasabley retain the spacing member at a corresponding angular orientation for retaining the second keying module at a corresponding angle with respect to the base assembly to increase the tenting angle of the second keying module.

15. An adjustable keyboard comprising:
a base assembly having a bottom portion configured to rest on a supporting surface, the base assembly having an upper surface with a raised central portion relative to opposing first and second lateral ends of the base assembly, to form opposing tenting angles with respect to the supporting surface during use;
a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end;
a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end;
a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules;
a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules;
a first palm rest configured to be removably coupled to the proximal end of the first keying module; and
a second palm rest configured to be removably coupled to the proximal end of the second keying module;
wherein the first and the second palm rests couple to the first and the second keying modules, respectively, via a coupling structure comprising at least one blade formed on each of the first and the second palm rests, the at least one blade being configured to removably engage at least one receptacle formed toward the proximal end of the first and the second keying modules, respectively, and wherein the coupling structure further comprises a beveled boss formed in the lower portion and toward the proximal end of each of the first and the second keying modules, the beveled boss being configured to lockingly engage a latch formed on the first and the second palm rests, allowing the user to lift the adjustable keyboard via exerting a lifting force to at least one of the palm rests.

16. An adjustable keyboard comprising:

a base assembly having a bottom portion configured to rest on a supporting surface, the base assembly having an upper surface with a raised central portion relative to opposing first and second lateral ends of the base assembly, to form opposing tenting angles with respect to the supporting surface during use, and the base assembly comprising a proximal base module slidably coupled to a distal base module, with respect to a user, to allow the user to extend the proximal base module toward the user;

a first keying module having a proximal end and a distal end with respect to a user, an outer lateral end laterally opposing an inner lateral end, an upper portion and a lower portion, the upper portion being configured to operatively retain a plurality of keys thereon and the lower portion being configured to be positionable adjacent a first portion of the upper surface of the base assembly extending between the raised central portion and the first lateral end;

a second keying module having a proximal end and a distal end with respect to the user, an outer lateral end laterally opposing an inner lateral end, an upper portion and a lower portion, the upper portion being configured to operatively retain a plurality of keys thereon and the lower portion being configured to be positionable adjacent a second portion of the upper surface of the base assembly extending between the raised central portion and the second lateral end;

a first coupling member configured to pivotably couple the first keying module to the base assembly to allow the user to selectively pivot the first keying module toward and away from the second keying module for separating the proximal end of the first keying module from the proximal end of the second keying module and forming a desired splay angle between the inner lateral ends of the first and the second keying modules; and a second coupling member configured to pivotably couple the second keying module to the base assembly to allow the user to selectively pivot the second keying module toward and away from the first keying module for separating the proximal end of the second keying module from the proximal end of the first keying module and forming, or contributing to, the desired splay angle between the inner lateral ends of the first and the second keying modules.

17. The adjustable keyboard of claim 16 wherein the proximal base module comprises an elongated slot and the distal base module comprises a protrusion configured to slidably position in the slot for slidably coupling the proximal and the distal base modules.

* * * * *